US009807044B2

(12) United States Patent
Agarwal et al.

(10) Patent No.: US 9,807,044 B2
(45) Date of Patent: Oct. 31, 2017

(54) SELECTIVE COMMUNICATION OF MESSAGES

(75) Inventors: Amit D. Agarwal, Mercer Island, WA (US); Jeffrey P. Bezos, Greater Seattle Area, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 195 days.

(21) Appl. No.: 13/620,721

(22) Filed: Sep. 15, 2012

(65) Prior Publication Data

US 2013/0018707 A1 Jan. 17, 2013

Related U.S. Application Data

(63) Continuation of application No. 12/200,865, filed on Aug. 28, 2008.

(51) Int. Cl.
*H04L 12/58* (2006.01)
*G06F 15/173* (2006.01)
*H04L 12/18* (2006.01)

(52) U.S. Cl.
CPC .......... *H04L 51/14* (2013.01); *H04L 12/1859* (2013.01); *H04L 51/12* (2013.01); *H04L 51/32* (2013.01)

(58) Field of Classification Search
CPC .......... H04L 51/32; H04L 51/12; H04L 51/14
(Continued)

(56) References Cited

U.S. PATENT DOCUMENTS 5,914,951 A * 6/1999 Bentley et al. ............... 370/352
6,434,599 B1 8/2002 Porter
(Continued)

FOREIGN PATENT DOCUMENTS

WO WO 2004/074984 A2 9/2004
WO WO 2007/130400 A2 11/2007

OTHER PUBLICATIONS

"Facebook Beacon: Enable Your Customers to Share Actions They Take on Your Website With Their Facebook Friends," Facebook 2008, retrieved Aug. 15, 2008, from http://www.facebook.com/business/?beacon.
(Continued)

*Primary Examiner* — Aaron Strange
(74) *Attorney, Agent, or Firm* — Knobbe, Martens, Olson & Bear LLP

(57) ABSTRACT

A message originator may generate messaging data for selective communication by a messaging provider via an interface generated by a browser software application. The user may also interact with various content providers such that event data is generated based on the user interaction with each content provider. The messaging provider can then obtain the messaging data and the event data to determine a target set of messages to be published. Additionally, the messaging provider can select a set of message recipients to receive, or otherwise access, the target set of messages based on filtering criteria submitted by the message originator, content provider, service provider, and/or message recipients. Credit may be allocated based on activity associated with the communicated messages. The messaging provider may also facilitate additional interaction between the message originator and the message recipients including the initiation of additional communication channels.

32 Claims, 13 Drawing Sheets

(58) Field of Classification Search
USPC .......................................................... 709/204
See application file for complete search history.

(56) References Cited

U.S. PATENT DOCUMENTS

| | | | |
|---|---|---|---|
| 6,760,727 B1* | 7/2004 | Schroeder et al. | |
| 7,149,288 B2 | 12/2006 | Digate et al. | |
| 7,184,524 B2 | 2/2007 | Digate et al. | |
| 7,263,545 B2 | 8/2007 | Digate et al. | |
| 7,440,976 B2 | 10/2008 | Hart et al. | |
| 7,657,465 B2* | 2/2010 | Freishtat et al. | 705/26.41 |
| 8,064,584 B2* | 11/2011 | Siegrist | 379/201.02 |
| 2004/0205134 A1 | 10/2004 | Digate et al. | |
| 2006/0123082 A1 | 6/2006 | Digate et al. | |
| 2006/0234735 A1 | 10/2006 | Digate et al. | |
| 2006/0270419 A1* | 11/2006 | Crowley et al. | 455/456.2 |
| 2007/0220092 A1* | 9/2007 | Heitzeberg et al. | 709/204 |
| 2007/0253424 A1 | 11/2007 | Herot et al. | |
| 2007/0265873 A1 | 11/2007 | Sheth et al. | |
| 2007/0282621 A1* | 12/2007 | Altman et al. | 705/1 |
| 2008/0033818 A1 | 2/2008 | Avissar | |
| 2008/0059455 A1 | 3/2008 | Canoy et al. | |
| 2008/0263009 A1 | 10/2008 | Buettner et al. | |
| 2009/0119167 A1 | 5/2009 | Kendall et al. | |
| 2011/0202606 A1 | 8/2011 | Agarwal et al. | |

OTHER PUBLICATIONS

McCarthy, C., "Facebook Mini-Feeds Get Hungrier: Yelp, Picasa, Flickr, Delicious," cnet.com, Apr. 15, 2008, retrieved Aug. 15, 2008, from http://news.cnet.com/8301-13577_3-9919633-36.html.

Nicole, K., "Flickr Facebook App Is Now Available," Mashable.com, Jun. 7, 2007, retrieved Aug. 15, 2008, from http://mashable.com/2007/06/07/flickr-facebook/.

Schonfeld, E., "Amazon's Latest Product Launch is a Couple of Facebook Apps," TechCrunch.com, Mar. 12, 2008, retrieved Aug. 15, 2008, from http://www.techcrunch.com/2008/03/12/amazons-latest-product-launch-is-a-couple-of-facebook-apps/.

* cited by examiner

SELECTIVE COMMUNICATION OF MESSAGES

CROSS-REFERENCE TO RELATED APPLICATION

This application is a continuation of and claims priority to U.S. patent application Ser. No. 12/200,865, entitled "SELECTIVE COMMUNICATION OF MESSAGES", and filed on Aug. 28, 2008. The disclosure of this application is hereby incorporated by reference in its entirety.

BACKGROUND

Generally described, computing devices and communication networks can be utilized to facilitate interaction between users. Specifically, users can utilize various computing devices, such as personal computing devices, mobile phones, and the like, to generate content that is transmitted and received by other users. In one aspect, content generated by a user can be generally published to a large set of potential users, or even the public at large. For example, a user may publish content via a network resource, such as a web site, web log ("blog"), etc., that may not be directed to any particular user and that may be accessed by a large group of users via computing devices. In another aspect, content generated by a user can be directed to a specific user, or specific set of users. For example, a user may publish content by utilizing an electronic messaging software application in which the recipients of the content can be specifically selected by the user to receive the published content in the form of an electronic mail message.

As software applications and computing devices evolve, a spectrum of social expectations for the type of user interaction for different forms of communication has also evolved. At one end of the communication spectrum, computing device users may engage in substantially synchronous communication methodologies in which participants are expected to be available to communicate and actively participate in the exchange of content. For example, users utilizing instant messaging software applications typically expect all of the participants in a "chat session" to be actively engaged in the exchange of content. The unavailability of a user and/or inactivity by a user can often lead to a termination of the chat session. At the other end of the communication spectrum, computing device users may engage in substantially asynchronous communication methods in which neither participant is expected to be available to communicate at any particular time and in which the exchange of content can occur at the convenience of either user. For example, users utilizing electronic mail software applications have at least some expectation that a response to a sent message will occur at the convenience of the recipient.

In between the above ends of the communication spectrum, computing device users may utilize a semi-synchronous communication method in which participants are not necessarily expected to provide instantaneous responses to content, but in which a response is expected within a period of time. For example, users utilizing a messaging-based network resource, such as a messaging web site, may publish short strings of content (e.g., messages) for other users to access. In such a messaging-based network resource, the published messages may expire after a short period of time, the messages may be replaced by newer, more recently published messages, and/or users may specify a limited amount of time in which a response is expected. However, users typically expect some delay in receiving a response based on the availability and/or interest of the recipient.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
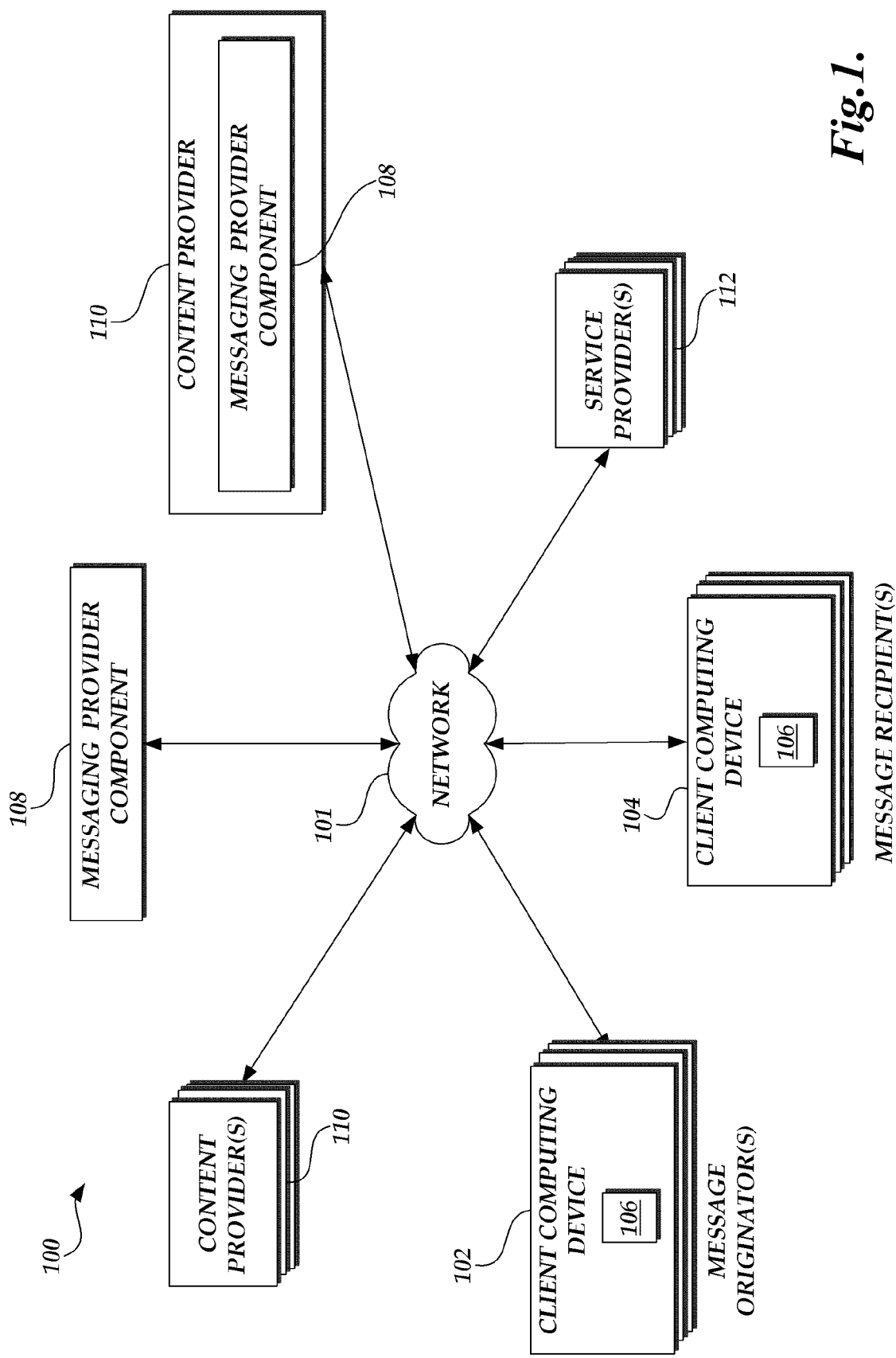
FIG. 1 is a block diagram of an illustrative messaging publication environment for use in the publication of messages corresponding to message originators.

Generally described, aspects of the present disclosure relate to the exchange of content via a communication network. More specifically, the present disclosure relates to the selective communication of messages associated with identified users, generally referred to as message originators. In one aspect, the messages associated with message originators may be generated by the message originators for the purposes of publication to a set of recipients, generally referred to as message recipients. In another aspect, the messages associated with message originators may be generated on behalf of the message originators for publication to the message recipients. The subject matter of the published messages can correspond to activities or events related to one or more network resources, such as a content provider network resource (e.g., a content provider web site). The messages may be selectively communicated, or published, to the message recipients by a messaging provider component, by an associated content provider, or by additional third parties. The selective communication can include the selective transmission of messages to the message recipients (e.g., electronic mail) and/or the controlled access of the messages via a network resource (e.g., a web site).

In one aspect, the publication of messages associated with a message originator may be utilized to provide information to the message recipients. The message recipients may be determined based on filtering rules associated with the message originator, the content provider, or the messaging provider component that define which message recipients may receive the published messages. The message recipients may also be determined based on filtering rules associated with the message recipients that define which messages the message recipient is willing to receive and/or which messages the message recipient is entitled to receive. The publication of the messages associated with the message originator may be contemporaneous with the creation of the message by the message originator or the interaction of the message originator with the content provider(s).

In another aspect, the publication of messages associated with a message originator may also be utilized to elicit additional actions by the message recipients by including additional information about the message originator, content providers(s), and message recipient(s), selectable controls to elicit additional actions by the message recipients, and the like. Still further, the publication of messages associated with a message originator may be utilized to elicit additional interaction between the message originator and the message recipients in the form of additional published messages and/or the initiation of additional communication between the message originator and the message recipient via additional communication channels.

By way of illustrative example, a message originator (e.g., a user at a client computing device) may create messages, such as text-based messages, that relate to the message originator's interaction with a content provider, such as a merchant. For example, the message originator may enter text (or select images) via an interface provided by the content provider or by an interface integrated with a software application, such as browser software application. The messages may identify recent interactions between the message originator and the content provider. The messages may also identify the message originator's viewpoints about certain items, such as products or services, offered by the content provider. Sample message originator messages could include "I recently purchased an electronic book reader from Store A and it is a great device!" or "I have used the Brand X toaster oven for 6 months and don't believe that it is worth the extra money," or "I can't seem to understand Author X's point in Chapter 7." In accordance with the above illustrative examples, the messages generated by the message originator are processed by a messaging provider component and selectively communicated, or published, to the message recipients. The publication of the messages may be contemporaneous with the generation of the messaging data by the message originator to elicit a real time or semi-real time effect.

For purposes of illustration, access to the published messages will be determined according to two aspects. In a first aspect, a set of potential message recipients is first filtered according to a message originator's social graph, or other organizational hierarchy, as specified in the message filtering rules maintained by the messaging provider component. For example, the message recipients will be limited to individuals/accounts designated by the message originator as "friends and family" according to the message originator's social graph (e.g., contacts maintained in a user profile). In a second aspect, to further filter the message recipients that can receive or otherwise access the published messages, the potential message recipients (e.g., designated as friends and family of the message originator) subscribe to receive any message from the message originator and/or messages related to the specific subject matter of a message (e.g., electronic book readers).

To selectively communicate the messages to the filtered set of message recipients, the messages may be integrated as part of content generated by the content provider, such as via a customized network resource (e.g., a customized web page) that includes a component for contemporaneously displaying published messages. The messages may also be published as part of a network resource dedicated to the publication of messages (e.g., a messaging web page). Thus, users can share their experiences/opinions related to the content provider via the contemporaneous publishing of messages created by the message originators.

In another illustrative example, messages may be created on behalf of a message originator based on the interaction between the message originator and a single content provider. Unlike the previous example in which the identified message originator specifically generated/edited the messages to be published, in this illustrative example, the content provider or the messaging provider component generates messages to be published based on various interactions of the message originator. Specifically, the messages are based on processing the message originator's activities with the content provider, a service provider or the messaging provider component. Such activity is processed by the content provider, service provider or messaging provider component and is generally referred to as event data.

In one illustrative example, the event data may relate specifically to items purchased or browsed by the message originator while accessing a network resource. Accordingly, in this illustrative example, the message generated from this type of event data would be "Bill recently purchased the XYZ digital camera from Store A." In another illustrative example, the event data may also relate to content accessed by the message originator via the content provider. For example, a message may be generated that indicates which keywords the message originator has submitted to a content provider search engine. Accordingly, in this illustrative example, the message generated from this type of event data would be "Cindy has just searched for Store A at www.searchengine.com."

Still further, in another illustrative embodiment, the event data may relate to information associated with the message originator that is generated by, or otherwise provided by, the content provider. For example, the event data may relate to items that were recommended to the message originator by a recommendation engine provided by the content provider or a recommendation service utilized by the content provider. Accordingly, in this illustrative example, the message generated from this type of event data would be "Maria was just recommended a cordless drill based on her purchase of hardware supplies from Joe's Hardware Store." In yet another illustrative example, the event data may relate to information related to the message originator and provided by a service provider, such as a web service. For example, the event data may relate to information generated by a service provider (e.g., a web service) in which an image submitted by the message originator is processed by the service provider to enhance the data and store the enhanced data in a memory account on behalf of the user. The enhanced data can then be used by the messaging provider component to generate a message on behalf of the message originator. Accordingly, in this illustrative example, if the image submitted by the message originator to an enhancement service was of a restaurant menu from The Café Restaurant, the message generated from this type of event data would be "Ava just asked us to recommend The Café Restaurant."

As previously described in the above example, the generated messages may be published as part of content generated by the content provider to the message recipients in the form of a customized network resource (e.g., a customized web page). The message may also be published as part of a network resource dedicated to publish messages (e.g., a messaging web page). The publication of the messages may also be contemporaneous in nature with the processing of the event data.

In another illustrative example, the event data may relate to information associated with the message originator that is generated or otherwise provided by a plurality of content providers. In this embodiment, the event data can correspond to any message originator activity with an identifiable network resource. Examples of the types of interactions and resulting messages were previously discussed above.

In this embodiment, the generated messages from all of the content providers are selectively communicated as part of a network resource dedicated to publish messages (e.g., a messaging web page). The publication of the messages may also be contemporaneous in nature with the processing of the event data. The messaging provider component may process the various messages to organize the publication of the message, such as by organizing the messages according to content provider, subject matter, time of day, and the like. Accordingly, in this embodiment, the network resource dedicated to publish messages functions as a clearinghouse of event data.

In all of the above examples, the messaging provider component may include additional enhancements/features to the content to be displayed as the message (e.g., content which is generated by the message originator or on behalf of the message originator). For example, the messages may be enhanced with additional information from a user profile associated with the message originator or the message recipients, such as including stored characteristics or descriptive information about the message originator and/or message recipient. Additionally, the messages may be enhanced with historical activity of the originator and/or message recipient. For example, the content to be displayed as a message may be supplemented with additional text that identifies the message originator's last three purchases (e.g., "Billy also purchased the following tracks last week: ABC, MusicTitle, and Don't Go Away."). In another example, the messages may be enhanced with actionable controls, such as hyperlinks or other controls, that direct the message recipient to a network resource provided by the content provider (e.g., a web site). The network resource may provide additional information regarding the subject matter of the message or facilitate the browsing/purchasing of items highlighted in the message, such as with a selectable control to add an item to an electronic shopping cart.

Still further, to provide additional incentive to generate messages and/or allow messages to be generated on the message originator's behalf, the messaging provider component and/or content provider may provide some form of credit for allowing messages to be published and/or for additional message recipient activity with the content provider that can be attributed to the messages. The credit may be in the form of redeemable points, organizational or hierarchical credits (e.g., a "gold level member"), qualification/accreditation credits, compensation, and the like. In an illustrative embodiment, the credit is specified as a function of the elicited activity (e.g., browsing specific network resources, purchasing items, providing information, etc.). With reference to a compensation example, credits for elicited activities can include, but are not limited to, fee schedules for elicited activities, percentage of sales, auction/bidding, etc. As applied to the previously discussed illustrative example, a hyperlink may be included in the published message for any identifiable item (e.g., a product or service) in the message content. Selection of any of the hyperlinks will result the allocation of a credit by the messaging provider component.

With continued reference to the above example, some portion of the credit for the elicited activity may be provided to the message originator. For example, a message originator may have enrolled in a credit allocation program with a content provider. Additionally, some portion of the credit for the elicited activity may be provided to the content provider for providing event data that resulted in the generated message. Still further, some portion of the credit for the elicited activity may be provided to a content provider in which the messages are published/selectively communicated. For example, a content provider may receive from a different content provider a percentage of all transactions attributable to messages generated from event data provided that content provider or from messages published by the content provider via a hosted network resource. Even further, the message provider component or content provider can allocate credit among multiple parties in various percentages/sharing allocations.

As previously described, the messaging provider component can utilize filtering rules to determine which potential message recipients receive, or otherwise can access, the published messages. In one aspect, the message originator, content provider, and/or messaging component provider may specify which potential message recipients may have access to some or all of the messages generated by the message originator or on behalf of the message originator. By way of illustrative example, the message provider component may utilize a social graph (e.g., a definition of contacts based on an organizational hierarchy) associated with the message originator to define a finite set of message recipients that may have access to messages published by the message originator. In this example, the messaging provider component can utilize a specific user's contact information and organizational hierarchies to determine a set of message recipients that may be eligible to receive/access published messages. In another example, the message provider component may utilize a social graph associated with the content provider or the message provider component to define the set of message recipients that have access to the published messages. In an illustrative example, the content provider's customer base can be used to determine message recipients eligible to receive/access published messages.

As previously described, in another aspect, message recipients may specify which published messages they are willing to receive. In an illustrative example, a potential message recipient may subscribe to receive published messages related to particular filtering criteria such as message subject matter category, message keywords, message originator profile information and the like. Based on the subscription, the message recipient would have access to all such published messages. Such access may be regardless of any filtering criteria provided by the message originator (e.g., filtering criteria based on the message originator's social graph). For example, a particular user may wish to access messages related to electronic booker readers that were published by message originators in a particular geographic region, such as a city. In this example, the message recipient would subscribe to either an electronic book reader subject matter category or submit specific makes/models/keywords of interest and would then be able to access messages satisfying the subscription criteria. In another example, another particular user may wish to access messages corresponding to specific questions submitted by message originators that were related to a particular movie or book. In this example, the message recipient would subscribe to the particular book or movie (e.g., subscribe to messages about War and Peace, Chapter 7 of "Electronic Principles," or the car chase scene found in the "Italian Job" movie), particular keywords associated with the particular movie or book that would found in the published messages (e.g., "semiconductor wafer polishing" or "Seattle"), subject matter categories, or other specific search criteria. Based on the subscription criteria, the message recipient would then be able to access messages satisfying the subscription criteria. Accordingly, the message recipient can control the type of messages that are presented by the messaging provider component. The messaging provider component can also define additional criteria, such as individual qualifications or credentials, that a potential message recipient would have to satisfy in order to receive/access published messages. For example, a potential message recipient may have to have passed a specific certification test in order to receive published messages related to a request for technical assistance.

In still a further illustrative example, one or more message recipients may specifically correspond to content providers or service providers. In this example, the message recipient may subscribe to receive published messages based on search criteria entered by message originators and matching product, service or company names. The message recipient may also subscribe to receive published messages based on browsing activity in which a specific item (e.g., a product or service) is browsed by the message originator. In still another example, a message recipient corresponding to a service representative may subscribe to receive published messages associated with a help control integrated into a browser software application that allows the message originator to automatically request assistance with whatever network resource is currently being displayed in the browser software application. In these examples, the social graph of the message originator would not be utilized to filter the set of potential message recipients because potentially appropriate message recipients, such as a service technician, would not likely be included in the message originator's social graph (unless by coincidence or based on previous service calls). Based on the message recipient subscription, the message recipient receives or accesses the published messages and can then initiate additional interaction with original message originators. The additional interaction can include publishing additional messages with information back to the original message originator. The additional interaction can also include the inclusion of selectable controls in the returned message, such as a "click to call" button or an embedded hyperlink, that would initiate or otherwise facilitate interaction over additional communication channels.

Although aspects of the present disclosure will be described with regard to an illustrative message publication environment and component interactions, communication protocols, flow diagrams and screen renderings, one skilled in the relevant art will appreciate that the disclosed embodiments are illustrative in nature and should not be construed as limiting. Additionally, activities, actions, and/or processes may be attributed in the present disclosure to the message originators, message recipients, content providers, or service providers as personally implemented as individuals or indirectly implemented as users of a computing device. Still further, although a number of illustrative examples will be discussed with regard to the present disclosure, such examples should not necessarily be construed as limiting.

With reference now to FIG. 1, a block diagram depicting an illustrative messaging publication environment 100 for use in the publication, or selective communication, of messages corresponding to message originators will be described. As illustrated in FIG. 1, the messaging publication environment 100 can include one or more client computing devices 102 corresponding to message originators. As previously described, the message originators 102 may generate messages via the client computing devices to be distributed via a communication network 101, such as the Internet. Additionally, the message originators 102 may have messages generated on their behalf for distribution via the communication network 101. The messaging publication environment 100 can also include one or more client computing devices 104 corresponding to message recipients. As also previously described, the message recipients 104 receive, or otherwise access, published messages from the message originators 102 via the communication network 101.

In an illustrative embodiment, the message originators 102 and message recipients 104 can correspond to a wide variety of computing devices including, but not limited to, personal computing devices, electronic book readers (e.g., e-book readers), hand held computing devices, integrated components for inclusion in computing devices, home electronics, appliances, vehicles, mobile telephones, personal digital assistants, laptop computers, gaming devices, computing terminals, and the like. The message originators 102 and message recipients 104 can further include a communication software application 106, such as browser software application, that facilitates the generation and/or rendering of the message content delivered via the communication network 101. Although the message recipients 104 are illustrated as a separate component of the messaging publication environment 100, one skilled in the relevant art will appreciate that a single computing device may function as a message originator component 102 and a message recipient component 104.

Those skilled in the art will appreciate that the communication network 101 may be any wired network, wireless network or combination thereof. In addition, the communication network 101 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

With continued reference to FIG. 1, the messaging publication environment 100 can include a messaging provider component 108 for obtaining messaging data and event data corresponding to message originators 102. As previously described, the messaging data can correspond to messages generated by a message originator 102 for publication. The event data can correspond to activity associated with the message originator 102 from which messaging data will be generated. As will be explained in greater detail below, the messaging provider component 108 processes the messaging data and event data to determine a target set of message (s) to be published on behalf of the message originator 102. The determination of the target set of message(s) can include the generation of the content that will be included in the message. The messaging provider component 108 then determines a set of message recipients that will receive, or can otherwise access, published messages according to filtering rules associated with the message originators 102, content providers, service providers, or message recipients 104. As illustrated in FIG. 1, the messaging provider component 108 may correspond to a separate component of the messaging publication environment 100, such as a web service, in which data, such as messaging data or event data, is exchanged via application programming interfaces ("APIs") over the communication network 101. Alternatively and as also illustrated in FIG. 1, the messaging provider component 108 may be integrated as a component of a content provider 110. Although embodiments will be described with regard to either a stand alone messaging provider component 108 or an integrated messaging provider component (in combination with a content provider 110), such embodiments should not be construed as limiting to either embodiment unless specifically noted.

As further illustrated in FIG. 1, the messaging publication environment 100 can include one or more content providers 110 that provide network resources accessed by the message originators 102. The content providers 110 can process the message originator activity and generate event data utilized by the messaging provider component 108 to generate messages on behalf of the message originator 102. Although not illustrated in FIG. 1, the content providers 110 can include various computing devices, software applications, and associated services for generating content and/or interacting with the message originators 102 and/or message recipients 104.

The messaging publication environment 100 can also include one or more service providers 112 that can provide event data corresponding to message originator 102 in a manner similar to the content providers 110. For example, a service provider 112 can correspond to a recommendation web service that interacts with a content provider. The recommendation web service generates recommendation event data utilized by the message provider component 108 to generate messages corresponding to the content recommended to message originator 102. In another example, the service provider 112 can correspond to a memory enhancement and storage web service that can process and enhance information stored on behalf of a message originator 102. The enhanced information can be provided as event data to the message provider component 108, which results in the generation of messages corresponding to the data remembered on behalf of the message originator 102. One skilled in the relevant art will appreciate that other types of services may be provided by a service provider 112 without departing from the scope of the present disclosure.

The service providers 112 can also obtain, or otherwise access, published message(s) (acting as a message recipient 104) and provide additional services/functionality to the message originators 102 based on published messages. For example, a service provider 112 can correspond to a technical help web service that utilizes the published messages to initiate an escalation protocol for assisting a message originator 102. In another example, the service provider 112 can correspond to a recommendation service to generate recommendations to a message originator 102 or message recipient 104 based on the content of the published messages associated with the message originator. Again, one skilled in the relevant art will appreciate that other types of services may be provided by a service provider 112 without departing from the scope of the present disclosure.

Figure 2:
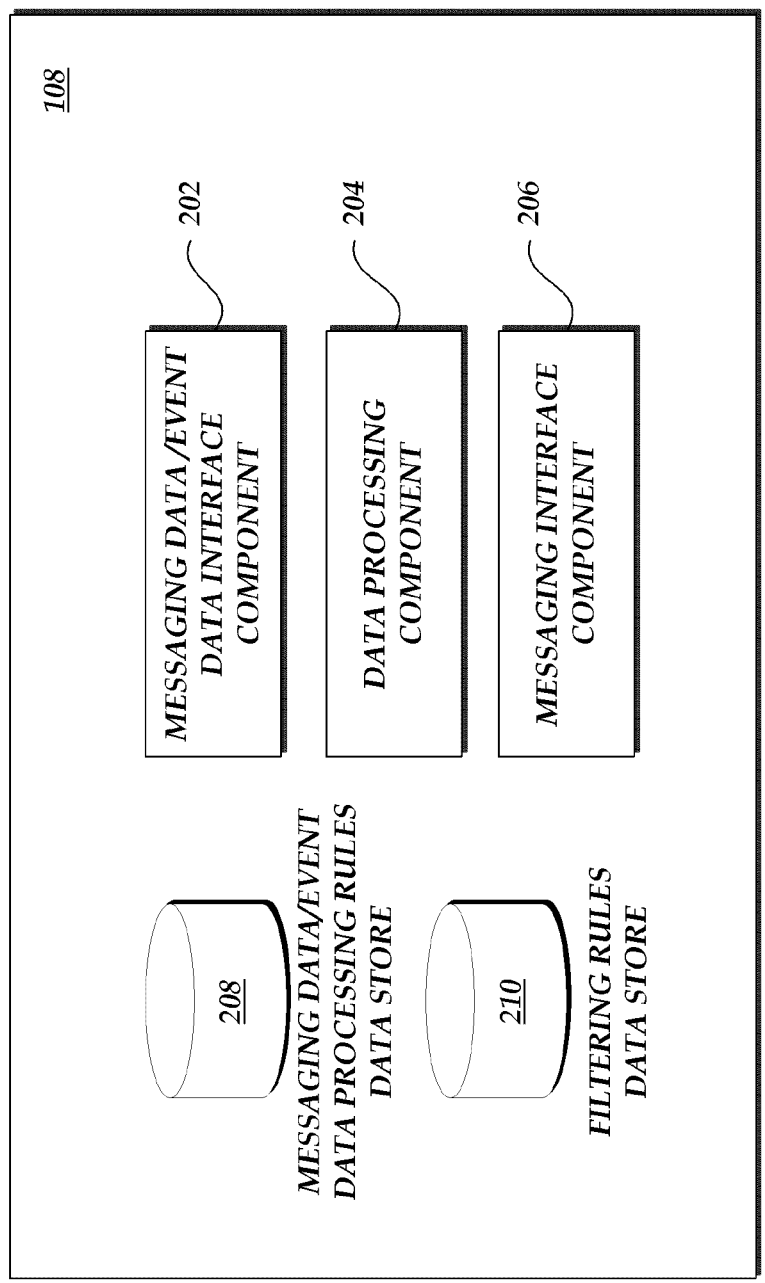
FIG. 2 is a block diagram illustrative of a messaging provider component corresponding to the messaging publication environment of FIG. 1.

With reference now to FIG. 2, illustrative components of a messaging provider component 108 will be described. The messaging provider component 108 can include a messaging data and event data interface component 202 for obtaining messaging data and event data corresponding to message originators 102. Illustratively, the messaging data and event data interface component 202 can obtain the messaging data, directly or indirectly, from the message originators 102. Additionally, the messaging data and event data interface component 202 can obtain the event data from message originators 102, content providers 110, or service providers 112.

The messaging provider component 108 further includes a data processing component 204 for processing the messaging data and the event data. In an illustrative embodiment, the data processing component 204 can utilize messaging data and/or event data processing rules to generate target messages to be published. The messaging data and event data processing rules can be maintained in a messaging data/event data processing rules data store 208. The processing of the messaging data and event data will be described in greater detail below. The messaging provider component 108 can also include a messaging interface component 206 for determining a set of message recipients 104 that receive published messages from a message originator 102, or otherwise can access published messages. The messaging interface component 206 may utilize filtering rules (specified by the message originator 102, message recipients 104, content providers 110, or message provider component 108) to determine the set of message recipients. The filtering rules can be maintained in a filtering rules data store 210. Additionally, the messaging interface component 206 may transmit the resulting message data to the set of recipients 104, content providers 110, or service providers 112 in accordance with any of a variety of communication protocols.

Although illustrative components of the messaging provider component 108 have been illustrated, one skilled in the relevant art will appreciate that the messaging provider component 108 can include a number of additional computing device components. Additionally, although the identified components of the messaging provider component 108 have been logically grouped, the various illustrative components may be implemented in a distributed network configuration, as one or more web service components and/or in a peer-to-peer network configuration.

Figure 3A:
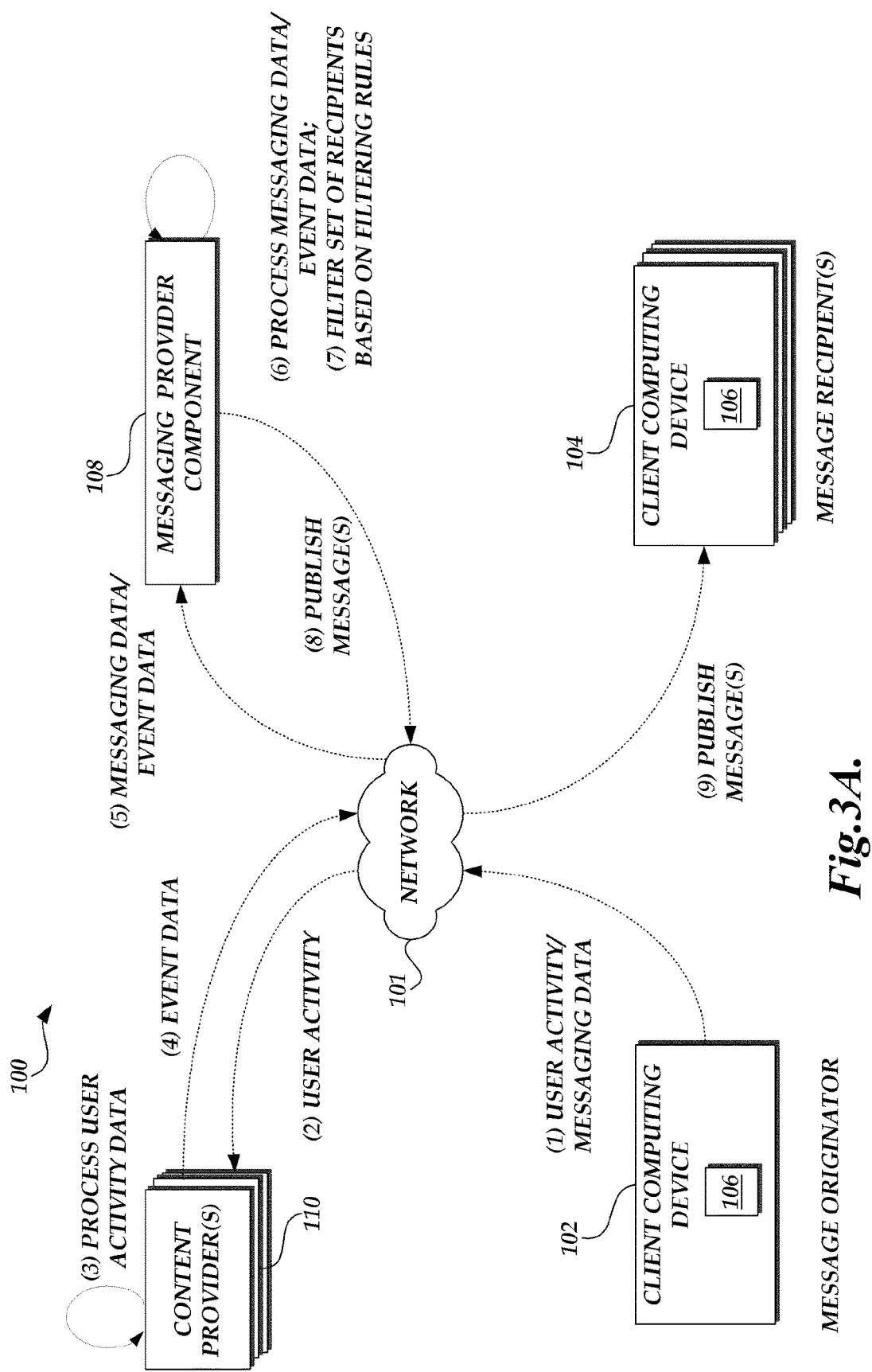
FIGS. 3A-3D are block diagrams of the messaging publication environment of FIG. 1 illustrating various embodiments corresponding to the processing of messaging data and event data by a messaging provider component and the publication of messages to various message recipients.

With reference now to FIGS. 3A-3D, illustrative interactions of the components of the messaging publication environment 100 for the generation and publication of messages based on message originators 102 will be described. With reference to FIG. 3A, a message originator 102 may interact with the messaging publication environment 100 in a number of ways that result in the generation of messages to be published by the messaging provider component 108. In one embodiment, a user associated with the message originator 102 may expressly generate messaging data via a user interface generated by the message originator. Illustrative interfaces for the generation of messaging data by the message originator 102 will be described below with regard to FIG. 5A. The messaging data may correspond to text-based messages, multi-media messages, and the like. The messaging data may also conform to size and type specifications, such as limits as to the number of characters, types of multi-media, file sizes, etc.

In another embodiment, the user associated with the message originator 102 may interact with one or more content providers 110. Such interaction will be generally referred to as user activity. Examples of user activity can include, but are not limited to, accessing/browsing specific content via a network resource (e.g., a web site), submitting search queries/keywords via a network resource, purchasing items from a content provider 110 via a network resource, submitting content to be posted on network resources (e.g., blogs), updating user profile information maintained by a content provider, and the like. In an illustrative embodiment, the message originator 102 does not need to identify any particular user activity as potential subject matter for incorporation into a message originator 102 message. In the embodiment in which event data is received from a plurality of content providers 110, the message provider component 108 functions as a centralized message processor and distributor.

Upon receipt of the user activity, each content provider 110 can process the user activity into event data to be transmitted to the messaging provider component 108. For example, the content provider 110 can utilize an API provided by the messaging provider component 108 to submit necessary information for generation of a message, such as information identifying the message originator 102, and a description of the relevant activity. Additionally, each content provider 110 can include additional information corresponding to the message originator 102, such as other historical interaction information, description information from user profiles, or other information associated with the message originator 102. Still further, in some embodiments, each content provider 110 can generate at least a portion of the target message for publication by the messaging provider component 108.

With continued reference to FIG. 3A, the messaging provider component 108 obtains the messaging data (from the message originator 102) and/or the event data (from one or more content providers 110) and begins processing the messaging data/event data to generate target messages. The processing of the messaging data/event data will be described in greater detail with regard to FIGS. 4A and 4B. Additionally, the messaging provider component 108 determines the set of message recipients 104 that will receive the published messages associated with the message originator 102 by filtering a set of potential message recipients according to filtering rules. As previously described, the filtering rules may be specified by the message originators 102, message recipients 104, content providers 110 and/or service providers 112. The determination of the set of message recipients 104 that may receive the published messages based on filtering rules/filtering criteria will also be described with regard to FIGS. 4A and 4B. Upon processing the messaging data and event data and the determination of the set of message recipients 104 based on the filtering rules, the messaging provider component 108 then selectively communicates, or publishes, the messages associated with the message originators 102 to the filtered set of message recipients 104. The publication of the messages may be made contemporaneously with the receipt of the messaging data from the message originator 102. Illustrative interfaces for publishing the messages will be described with regard to FIGS. 6A-6C.

Figure 3B:
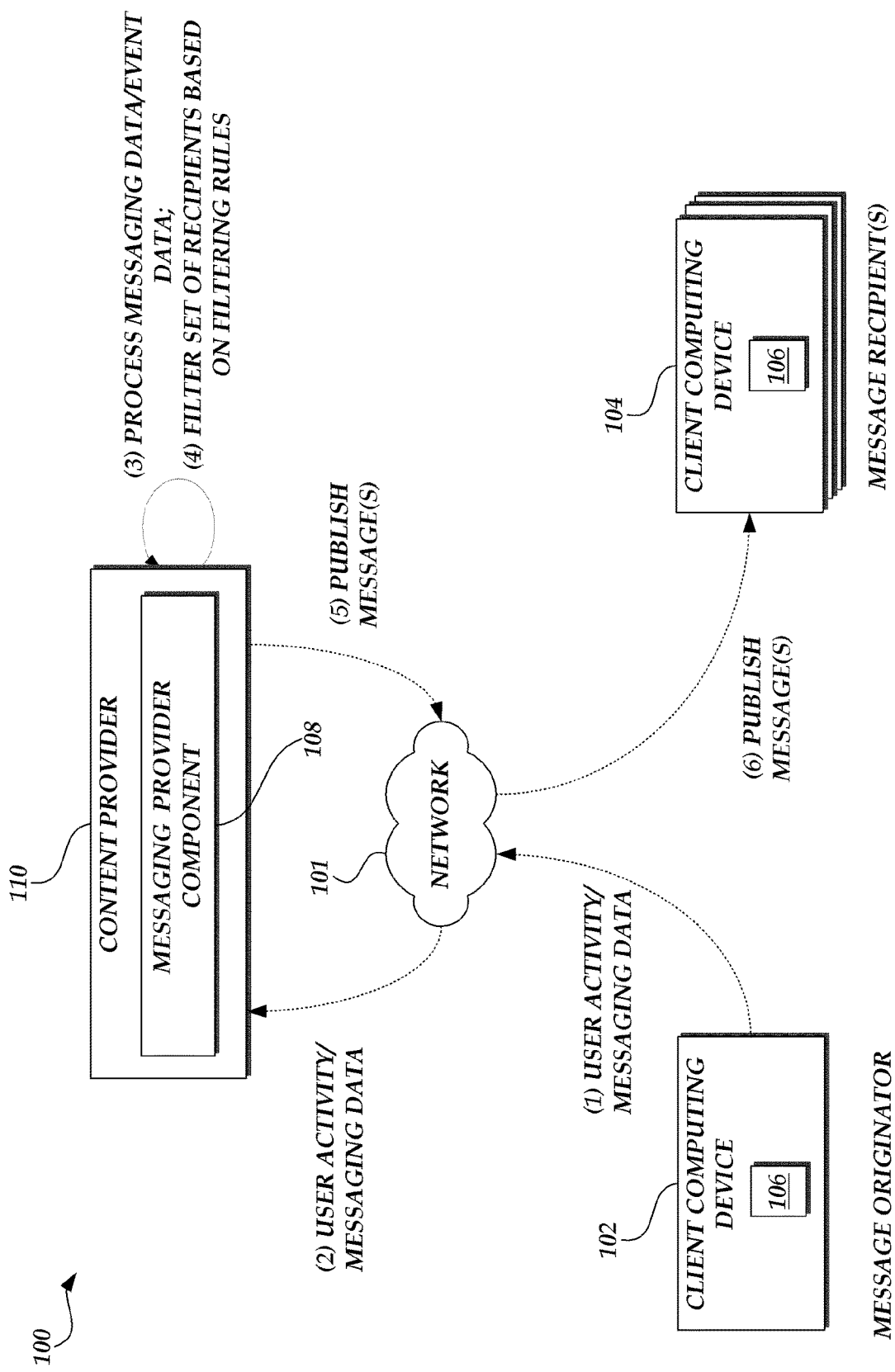

With reference now to FIG. 3B, in an alternative embodiment, the messaging provider component 108 may be integrated (physically or logically) with a particular content provider 110. In a manner similar to the interaction illustrated in FIG. 3A, a message originator 102 may interact with the messaging publication environment 100 in a number of ways that result in the generation of messages to be published by the messaging provider component 108 including the generation of messaging data by the message originator and the interaction of the message originator with the content providers 110. However, as illustrated in FIG. 3B, in this embodiment, the messaging data is transmitted to the messaging provider component 108 through the content provider 110. Additionally, because the messaging provider component 108 is integrated with the content provider 110, the event data resulting from the user activity is not separately transmitted to the messaging provider component 108 and may be generated directly by the messaging provider component from the activity data.

Similar to the interaction described with regard to FIG. 3A, the messaging provider component 108 processes the messaging data, the activity data, and/or the event data (if another component within the content provider 110 generates the event data) to generate target messages. Illustratively, the target set of messages corresponds to the message content that will be selectively communicated to message recipients 104 based on the processed messaging data and event data. Additionally, the messaging provider component 108 determines the set of message recipients 104 that will receive, or otherwise have access to, the published messages associated with the message originator 102 by filtering a set of potential message recipients according to filtering rules. As previously described, the filtering rules may be specified by the message originators 102, message recipients 104, content providers 110 and/or service providers 112. Upon processing the messaging data and event data and determining the set of message recipients 104 based on the filtering rules, the messaging provider component 108 then publishes the messages associated with the message originator 102. The publication of the messages may be made contemporaneously with the receipt of the event data corresponding to the message originator 102 and the generation of corresponding messages by the messaging provider component 108.

Figure 3C:
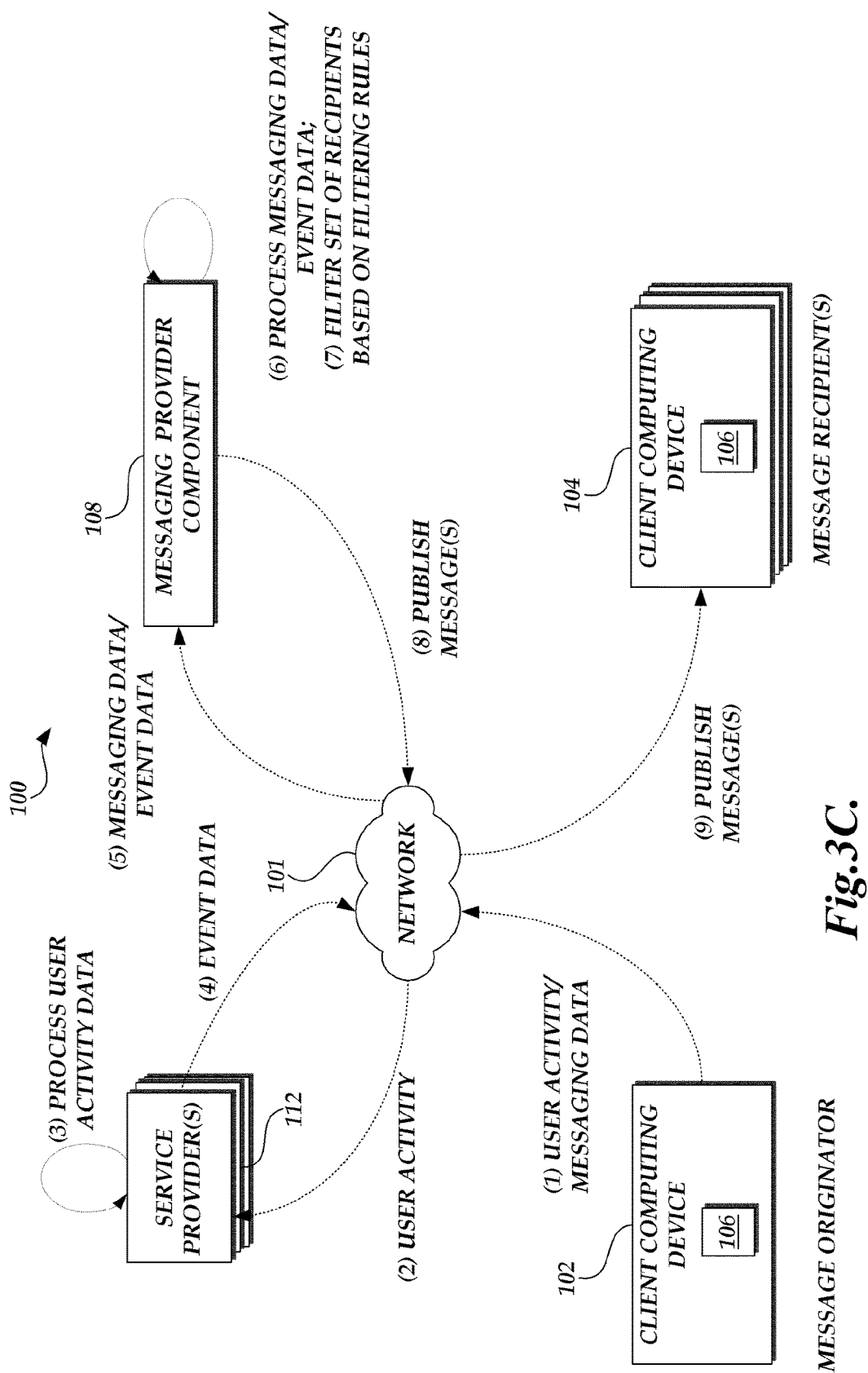

With reference now to FIG. 3C, in another embodiment, one or more service providers 112 may provide event data utilized to generate messages on behalf of the message originator 102. FIG. 3C is a simplified block diagram of the messaging publication environment 100 of FIG. 1 in which the content provider 110 is not shown for purposes of illustrating the additional interaction of a service provider 112 to provide event data. However, the additional interaction provided by the service provider 112 may be incorporated into either of the embodiments illustrated in FIGS. 3A and 3B, and the interaction illustrated in FIG. 3C should not be construed as limiting.

With reference to FIG. 3C, a message originator 102 may continue to interact with the messaging publication environment 100 in a number of ways that result in the generation of messages to be published by the messaging provider component 108 including the generation of messaging data by the message originator. However, in this embodiment, the interaction of the message originator 102 with a service provider 112 may also result in the generation of event data that in turn may result in the generation of messages on behalf of the message originator. Examples of the interaction between the message originator 102 and the service providers 112 can include recommendation services, user profiling/user registration services, network-based storage and processing services, data enhancement services, and the like. For example, as previously described with regard to an illustrative example, a service provider 112 may correspond to a data enhancement and storage service in which a user submits an image that is processed to identify items of interest to the user and to provide additional information related to the submitted image. As illustrated in FIG. 3C, the interaction between the message originator 102 and at least one service provider 112 may occur directly as facilitated via the communication network 101. Alternatively, the interaction between the message originator 102 and at least one service provider 112 may be facilitated indirectly, such as through a content provider 110.

In a manner similar to the interaction described with regard to FIGS. 3A and 3B, the messaging provider component 108 obtains the messaging data (from the message originator 102) and/or the event data (from the service provider 112) and begins processing the messaging data/event data to generate target messages. Additionally, the messaging provider component 108 determines the set of message recipients 104 that will receive the published messages associated with the message originator 102 by filtering a set of potential message recipients according to filtering rules. As previously described, the filtering rules may be specified by the message originators 102, message recipients 104, content providers 110 and service providers 112. Upon processing the messaging data and event data and determining the set of message recipients 104 based on the filtering rules, the messaging provider component 108 then publishes the messages associated with the message originators 102. As previously described, the publication of the messages may be made contemporaneously with the receipt of the event data corresponding to the message originator 102 and the generation of corresponding messages by the messaging provider component 108.

Figure 3D:
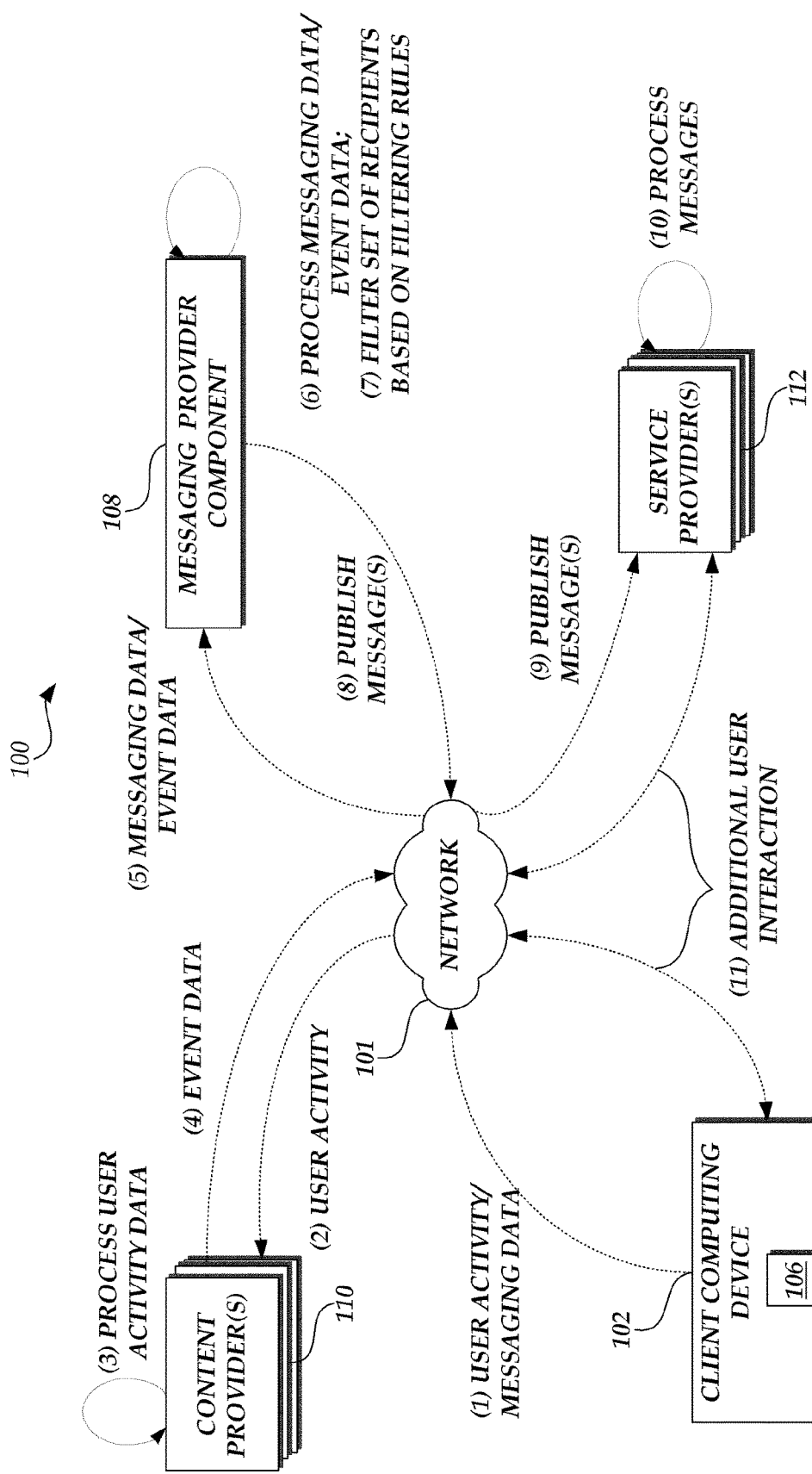

With reference now to FIG. 3D, in another embodiment, one or more service providers 112 may be designated as message recipients 104 to receive, or otherwise access, messages published on behalf of the message originator 102. FIG. 3D is a simplified block diagram of the messaging publication environment 100 of FIG. 1 in which only the service provider 112 is shown for purposes of illustrating the additional interaction of a service provider 112 to receive/access the published messaging data. However, the additional interaction provided by the service provider 112 may be incorporated into any of the embodiments illustrated in FIGS. 3A-3C, and the interaction illustrated in FIG. 3D should not be construed as limiting.

In a manner similar to the interaction illustrated with regard to FIG. 3A, a message originator 102 may interact with the messaging publication environment 100 in a number of ways that result in the generation of messages to be published by the messaging provider component 108. The generation of messages can include the generation of messaging data by the message originator 102 and the generation of event data corresponding to the interaction of the message originator with content provider(s) 110. In one embodiment, a user associated with the message originator 102 may expressly generate messaging data via a user interface generated on the message originator. In another embodiment, the user associated with the message originator 102 may interact with one or more content providers 110 to generate event data. The resulting messaging data and event data is transmitted to the messaging provider component 108.

In a manner similar to the interaction described with regard to FIGS. 3A-3C, the messaging provider component 108 obtains the messaging data (from the message originator 102) and/or the event data (from the content provider 110 or the service provider 112) and begins processing the messaging data/event data to generate target messages. Additionally, the messaging provider component 108 determines the set of message recipients 104 that will receive the published messages associated with the message originator 102 by filtering a set of potential message recipients according to filtering rules. As previously described, the filtering rules may be specified by the message originators 102, message recipients 104, content providers 110 and service providers 112. Upon processing the messaging data and event data and the determination of the set of message recipients 104 based on the filtering rules, the messaging provider component 108 then publishes the messages associated with the message originators 102.

In accordance with the illustrative embodiment of FIG. 3D, at least one service provider 112 is designated as a message recipient 104 and receives (or can otherwise access) the published messages. Examples of the service providers 112 that can receive the published messages include service providers associated with a customer service agent, a content provider 110, sales and marketing service providers, and the like. For example, as previously described with regard to previously described illustrative examples, the service provider 112 may correspond to a technical help service provider that receives messages published based on the selection of a help control selected by a user or the submission of a question by a user. The service provider 112 can then initiate additional user interaction with the message originator 102 via the communication network 101. The additional interaction can include the publishing of additional messages between the original message originator 102 and the service provider 112 (using the same user interface to create a message thread). The additional interaction can also include the initiation of additional or alternative communication methodologies between the original message originator 102 and the service provider 112. For example, the service provider 112 can include a control, such as a "click-to-call" control, that would initiate a voice over IP ("VOIP") communication between the message originator 102 and the service provider 112. One skilled in the relevant art will appreciate that any number of communication methodologies may be employed between the message originator 102 and the service provider 112.

Figure 4A:
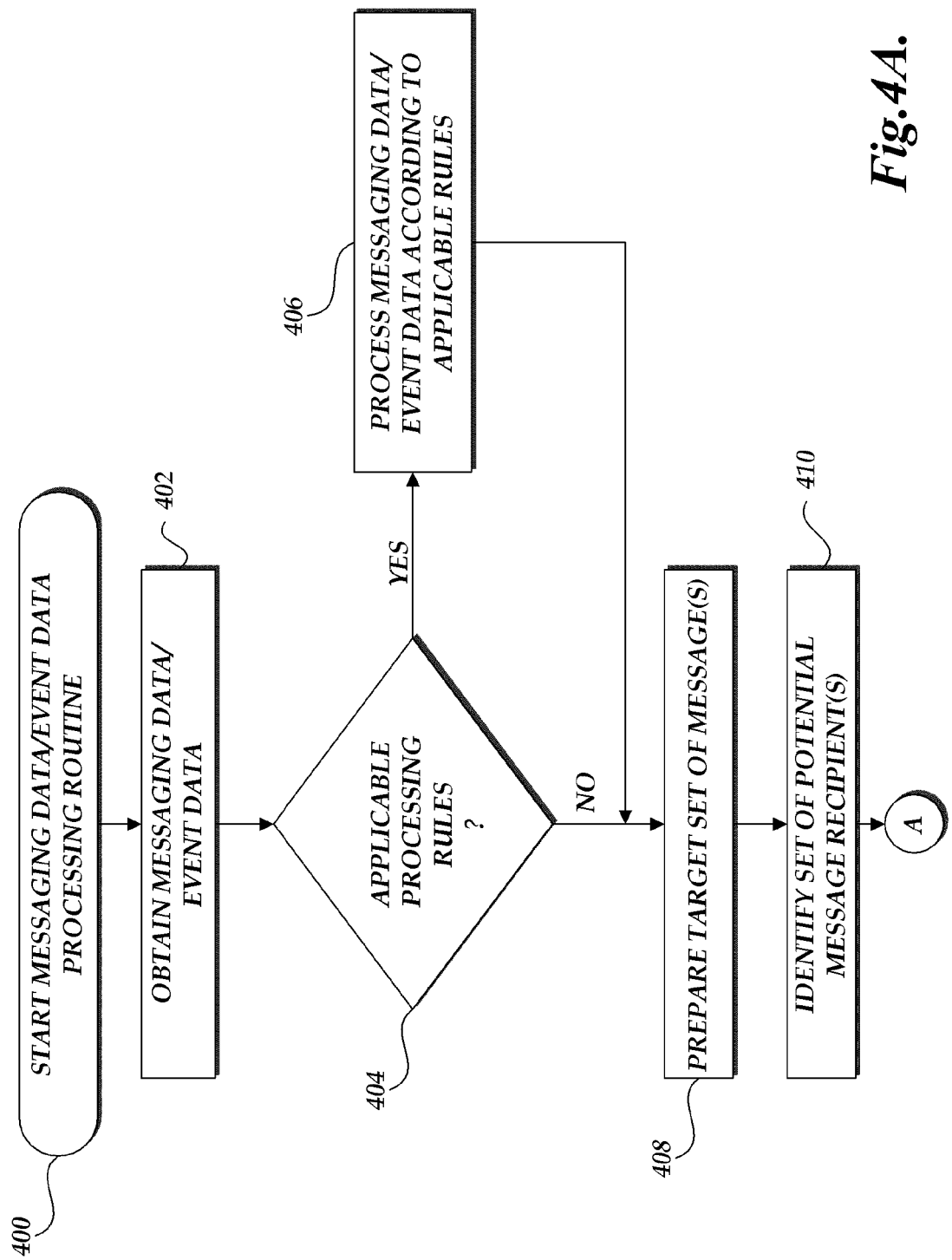
FIGS. 4A and 4B are flow diagrams of an illustrative messaging data and event data processing routine implemented by a messaging provider component to selectively communicate messages to various message recipients.
Figure 4B:
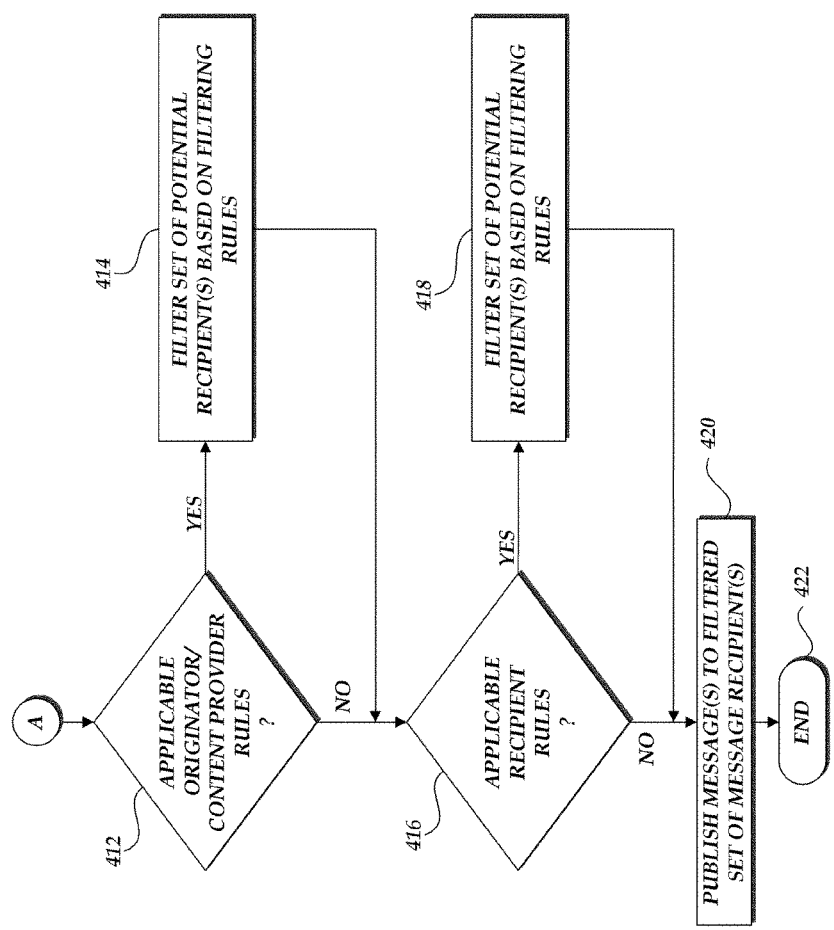

Referring now to FIGS. 4A and 4B, a messaging data and event data processing routine 400 implemented by the messaging provider component 108 to process messaging data and/or event data will be described. With reference to FIG. 4A, at block 402, the messaging data and event data interface component 202 (FIG. 2) of the messaging provider component 108 obtains messaging data/event data. As previously described, the messaging data and event data interface component 202 can obtain the messaging data, directly or indirectly, from the message originators 102. As will be described below with regard to FIGS. 5A and 5B, the messaging data may be obtained from a user interface generated in accordance with accessing a network resource (e.g., a web site), functionality associated with a browser software application (e.g., a plug-in or toolbar), or from a software application executed on the message originator 102 computing device (e.g., a function or control provided in an e-book reader). The messaging data may correspond to text-based messages, multi-media messages, and the like. The messaging data may also conform to size and type specifications, such as limits as to the number of characters, types of multi-media, file sizes, etc.

As also previously described, the messaging data and event data interface component 202 can obtain the event data from message originators 102, one or more content providers 110, and/or one or more service providers 112. The event data can include an identification of the message originator 102, a description of the relevant activity, additional information corresponding to the message originator 102, such as other historical interaction information, description information from a user profile, or other information associated with the message originator 102, and at least a portion of the target message for publication by the messaging provider component 108. In the event that the messaging provider component 108 is integrated with a content provider 110, the messaging data and event data interface component 202 may also obtain user activity data that will be processed into event data. As previously mentioned, in an illustrative embodiment, an incentive may be provided by the message provider component 108 or content provider 110 based on the messages generated on behalf of the message originator 102. In one embodiment, the message originators 102 may be provided credits based on the amount of event data (or messaging data) that is created or collected on their behalf and/or message recipient activity that can be attributed to published messages. In other embodiment, content providers 110 associated with the event data and/or the selective communication of the messages may be provided credits based on the amount of event data (or messaging data) that is created or collected and/or message recipient activity that can be attributed to published messages. Still further, credit may be allocated to multiple parties, such as the message originator 102 and one or more content providers 110, one or more service providers 112, and the like.

At decision block 404, a test is conducted to determine whether messaging data and/or event data rules should be applied to the received messaging data/event data. If one or more messaging data or event data rules apply, the data processing component 204 (FIG. 2) of the messaging provider component 108 processes the messaging data/event data according to applicable rules at block 406. With regard to received messaging data, the data processing component 204 may process received messaging data from the message originator 102 to ensure that the messaging data conforms to formatting specifications (font, style, message length, etc.). In another embodiment, the data processing component 204 may process the content of the messaging data for derogatory/vulgar language, to correct for spelling and grammatical errors, to translate language, etc. In a further embodiment, the data processing component 204 may further process the messaging data to add additional data. In this embodiment, the data processing component 204 can include additional information associated with the message originator 102, including additional historical data from previous published messages, interaction with content providers 110, user profile data, identification information, and the like. The data processing component 204 can add additional contextual information associated with the subject matter of the messaging data, such as an identification of the author and title of a book based on messaging data including content corresponding to the book. The data processing component 204 can also enhance the existing messaging data by including additional multi-media data (such as image, sound, or video data) with messaging data. The data processing component 204 can also embed a selectable control, such as hyperlink data in the message. The selectable control can be directed to certain keywords in the message data that would direct a browser software application to a specific network resource (providing more information or offering items for purchase).

With regard to received event data, the data processing component 204 may process the event data to generate the content for the messages published on behalf of the message originator. In one embodiment, the data processing component 204 may utilize one or more message templates in which the format, style and portions of the content have been established. In this embodiment, the data processing component 204 can apply the information transmitted in the event data to the message templates. Additionally, the data processing component 204 can include additional information associated with the message originator 102, including additional historical data from previous published messages, interaction with content providers 110, user profile data, identification information, and the like. The additional information may be included in the event data transmitted to the messaging provider component 108 or can be obtained independently by the messaging provider component. As previously described with regard to the processing of messaging data, the data processing component 204 can also enhance the received event data by including additional multi-media data and/or can also embed a selectable control, such as hyperlink data in the message. The selectable control can be directed to certain keywords in the message data that would direct a browser software application to a specific network resource. The network resource could provide more information about the item or offer various items for purchase.

In another embodiment, the data processing component 204 may not generate messages from the entire set of received event data associated with message originators 102. In this embodiment, the data processing component 204 may select or prioritize specific types of event data that is generated into messages. For example, the processing rules may establish that certain types of activities, such as purchases, additions to wishlists, failures to complete a purchase (e.g., navigation away from a shopping cart or other fulfillment network resource), etc., should always result in the generation of a message. The processing rules may also establish that certain types of activities, such as the purchase of personal items, should not result in the generation of messages. The selection/prioritization of the types of event data that results in the generation of messages may be configured by message originators 102 as part of a registration process with the messaging provider component 108 or the content provider 110. The selection/prioritization of event data that results in the generation of messages may also be specified by the content provider 110 or the messaging provider component 108. For example, a messaging provider component 108 may have contractual obligations to prioritize messages generated from event data from a specific content provider 110 over messages generated from another content provider. Additionally, the data processing component 204 may generate multiple messages from the set of received event data that may be published with different content providers and/or customized for different purposes. For example, event data corresponding to a specific purchase may generate a first, more generic message for the general public and a second, more specific message that will be published to a smaller subset of message recipients 104.

In still a further embodiment, the data processing component 204 may provide the message originator 102 with drafts of the generated messaging data for approval or modification. In this embodiment, the data processing component 204 may be configured to require explicit approval from the message originator 102 prior to proceeding with the publication of the messages. In a variation of this embodiment, the data processing component 204 may provide the drafts of the generated messaging data to a verification/proofreading service (automated or manual) for verification, modification and/or enhancements.

Referring again to FIG. 4A, if no processing rules are applicable at decision block 404 or once the processing rules have been applied, at block 408, the data processing component 204 prepares the target messages for publication. In an illustrative embodiment, preparation of target messages may correspond to the collection and forwarding of the messages to the messaging interface component 206 (FIG.

2) of the messaging provider component 108. Additionally, as previously described, the target set of messages corresponds to the message content that will be selectively communicated to message recipients 104 based on the processed messaging data and event data. At block 410, the messaging interface component 206 identifies the potential set of message recipients 104 that may receive or otherwise access the published messages. In an illustrative embodiment, the identification of the potential set of message recipients occurs prior to filtering the set of recipients and corresponds to an initial determination of message recipients that could possibly receive/access the published messages. For example, the message interface component 206 may determine which message recipients 104 are available to receive messages (e.g., active on the communication network), which message recipients have active subscriptions, and the like.

Referring now to FIG. 4B, at decision block 412, the messaging interface component 206 determines whether there are any applicable message originator 102 or content provider 110 filtering rules. If applicable filtering rules exist, at block 414, the messaging interface component 206 filters the set of potential message recipients 104 according to the applicable filtering rules. As previously described, the message originator 102 can specify which message recipients 104 may be eligible to receive/access published messages. For example, the message originator 102 can define a social graph, commonly found in social networking network resources, that corresponds to an organizational hierarchy for the message originator. Examples of such social graphs include individuals defined according to levels of indirection (e.g., 1st, 2nd, 3rd, etc.), defined categories (e.g., friends and family, work colleagues, etc.), and the like. Additionally, or alternatively, the content provider 110 can specify which message recipients may be eligible to receive/access published messages. For example, the content provider 110 may also define a social graph that corresponds to an organizational hierarchy of the content provider. One skilled in the relevant art will appreciate that additional or alternative filtering rules can be applied or that additional or alternative filtering rules could be provided by other components of the messaging publication environment 100.

If no message originator 102 or content provider 110 filtering rules are applicable at decision block 412 or once the applicable filtering rules have been applied at block 414, at decision block 416, the messaging interface component 206 determines whether there are any applicable message recipient 104 filtering rules. If applicable filtering rules exist, at block 418, the messaging interface component 206 filters the set of potential message recipients 104 according to the applicable filtering rules. In an illustrative embodiment, the message recipient 104 may specify which published messages he or she is interested in receiving/accessing. In one embodiment, the message recipient filtering rules may be utilized to filter out message recipients that have selected not to receive/access, or are otherwise determined to be ineligible to receive/access, the published messages. For example, a message recipient 104 may choose not to receive messages from individuals not included in his or her social graph. In another embodiment, the message recipient filtering rules may be utilized to specifically select which message recipients 104 have elected to receive certain published messages. With reference to a previous illustrative example, the filtering rules may identify which message recipients (such as a service provider 112) have selected to receive messages corresponding to messages generated when a message originator utilizes a product name as a search query.

If no message recipient filtering rules are applicable at decision block 416 or once the applicable filtering rules have been applied at block 418, at block 420, the messaging interface component 206 publishes the prepared target messages (block 408) to the filtered set of message recipients 104. In an illustrative embodiment, the publication of messages may correspond to the contemporaneous posting of the messages to a dedicated messaging network resource (e.g., a web site) that may be accessed by one or more message recipients. In another embodiment, the selective communication, or publication, of messages may correspond to inclusion of the published messages in a customized network resource provided by a content provider 110. In another embodiment, the selective communication of messages can include the generation of messages that are directly transmitted to message recipients, such as in accordance with electronic mail, instant messaging, short message service (SMS) communication protocols and the like. In still another embodiment, the selective communication of messages can include the batch processing of messages that are not necessarily contemporaneous with the receipt of the messaging data or the event data. Illustrative screen renderings corresponding to the publication of published messages will be described with regard to FIGS. 6A-6C. At block 422, the routine 400 terminates.

Figure 5A:
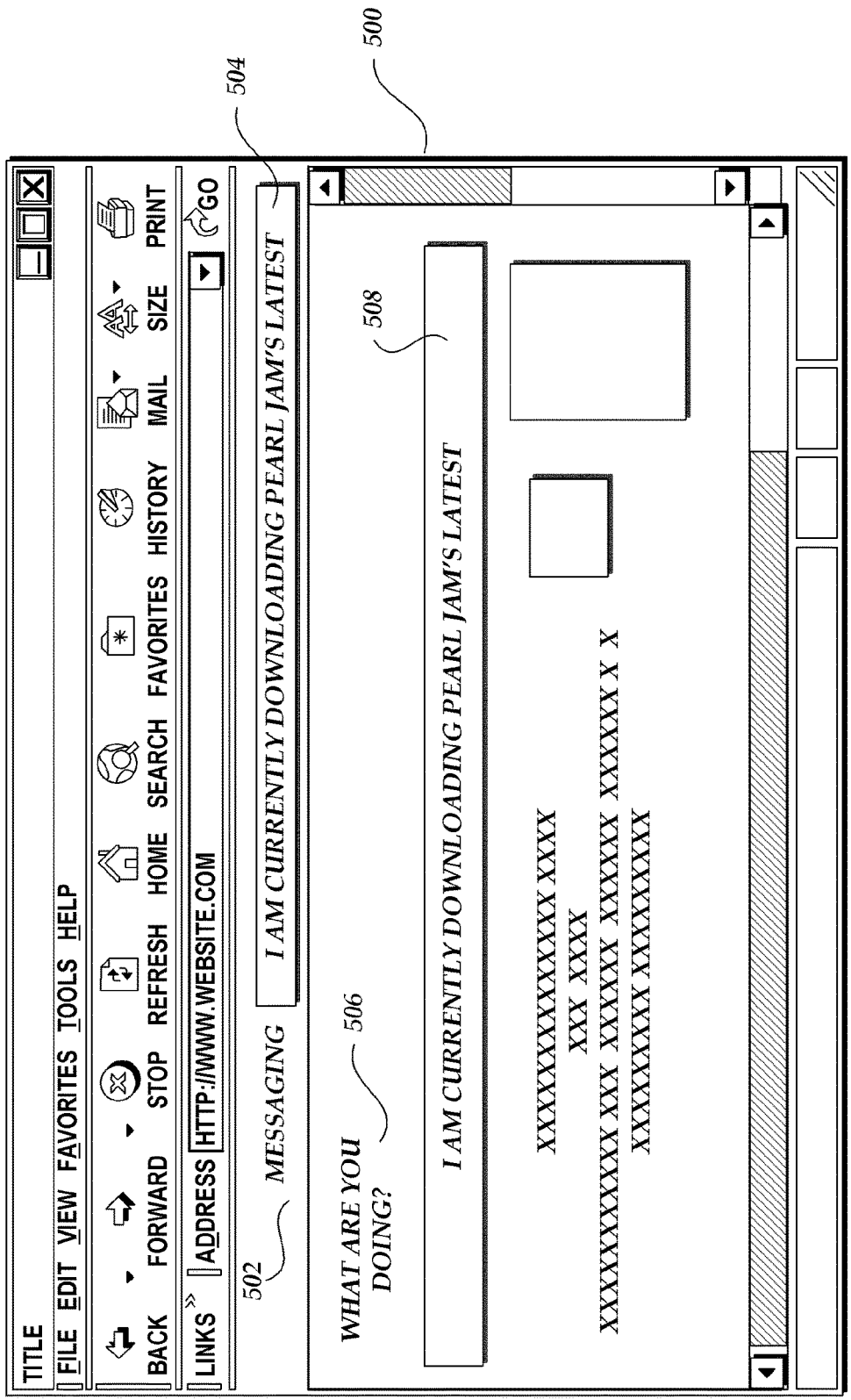
FIGS. 5A and 5B are illustrative screen renderings generated by message originator client computing devices to obtain messaging data.
Figure 5B:
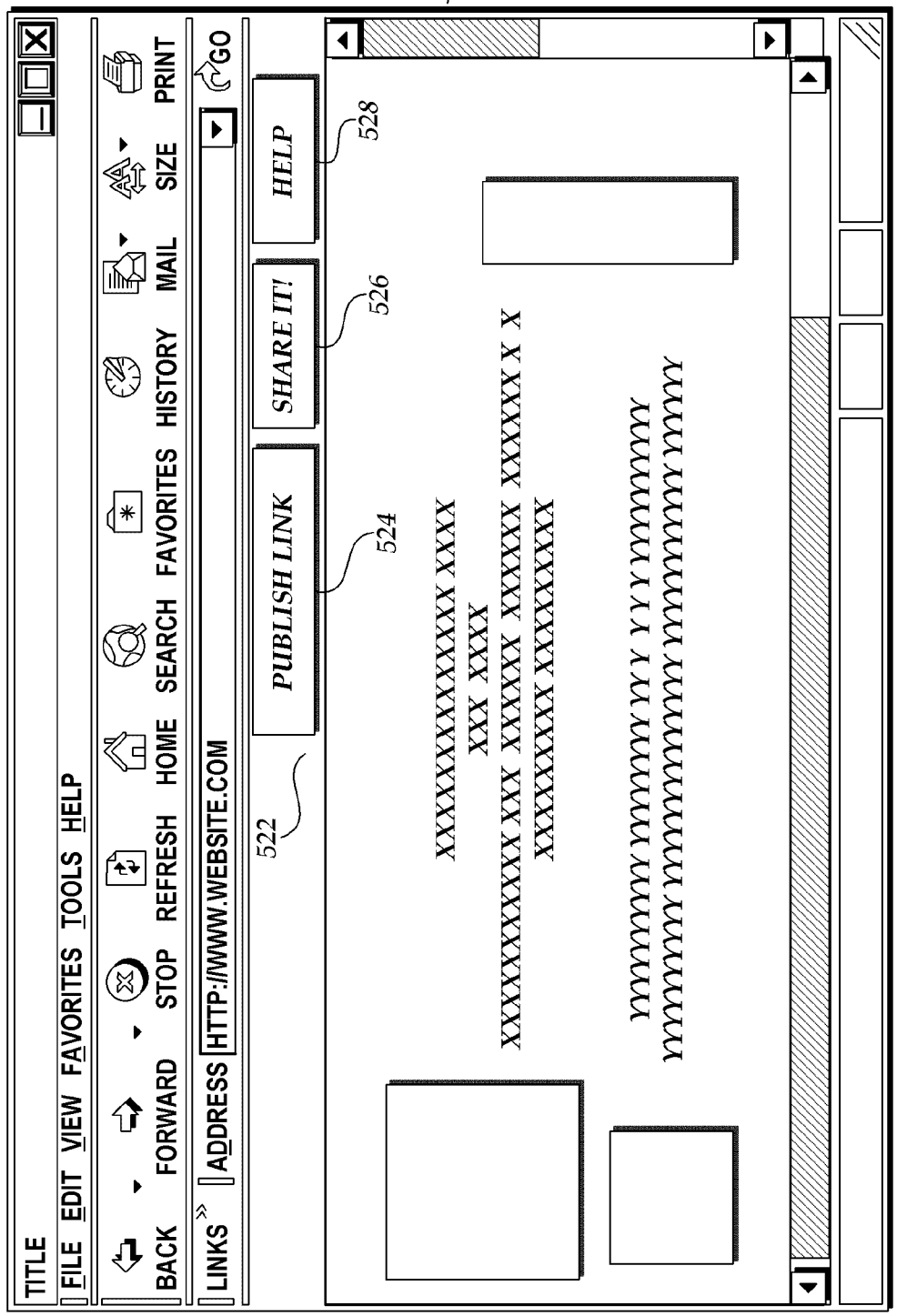

With reference now to FIGS. 5A and 5B, illustrative screen renderings 500, 520 generated by the message originator 102 for creating messaging data will be described. With reference to FIG. 5A, in an illustrative embodiment, a screen rendering 500 can be generated on the message originator client computing device 102. The purpose of the screen rendering, among others, may be for obtaining messaging data that is explicitly generated by the message originator 102. In this illustrative embodiment, the screen rendering 500 includes a first portion 502 for obtaining messaging data. Portion 502 can correspond to functionality included, or otherwise added to, a browser software application utilized by a user to access a network resource, such as via a plug-in or toolbar component. Accordingly, portion 502 may be displayed to the user as part of the browser software application and regardless of the specific network resource currently being accessed. or rendered, on a display portion of the browser software application. In this embodiment, the portion 502 includes a text input control 504 for accepting text-based messages from a user. Portion 502 can also include additional functionality that may limit text inputs to a preset number of characters, that provides spell checking/grammar checking functionality and the like. Additionally, portion 502 could include additional or alternative controls that would accept different forms of user input, such as file selection controls.

With continued reference to FIG. 5A, the screen rendering 500 can include a portion 506 that can also be used to obtain messaging data. Portion 506 can correspond to functionality that is presented to a user while accessing a specific network resource. For example, the portion 506 can correspond to functionality generated by the browser software application from markup language and executable code (e.g., scripts). Similar to portion 502, portion 506 can include a text entry control 508 for obtaining text-based messages from a user. As previously mentioned with regard to portion 502, portion 506 can include additional functionality that may limit text inputs to a preset number of characters, provides spell checking/grammar checking functionality, and the like. Further, portion 506 could include additional or alternative controls that would accept different forms of user input, such as file selection controls. Although the screen rendering 500 has been illustrated as incorporating both messaging data generating portions 502 and 506, one skilled in the relevant art will appreciate the portion 502 or portion 506 may be used independently.

With reference now to FIG. 5B, in another embodiment, a screen rendering 520 can be used to obtain user activity data from which messaging data will be generated on behalf of the message originator 102. As previously mentioned, in most embodiments, event data is generated from a message originator's interaction with a content provider 110 without requiring any additional interaction/action by the message originator. In this illustrative embodiment, the screen rendering 520 includes a first portion 522 for displaying selectable controls on the browser software application. Based on a selection of one of the selectable controls, event data corresponding to the selection is sent to the messaging provider component 108, which can result in the selective communication of messages based on the event data. Although the controls are illustrated in FIG. 5B as corresponding to a browser software application, one skilled in the relevant art will appreciate the controls may also be associated with other software applications and/or incorporated into various message originator 102 computing devices, such as an electronic book reader software application or electronic book reader computing device.

As described above with regard to portion 502 (FIG. 5A), portion 522 can correspond to functionality included, or otherwise added to, a browser software application utilized by a user to access a network resource, such as via a plug-in or toolbar component. Accordingly, portion 522 may be displayed to the user regardless of the network resource currently being accessed, or rendered, on a display portion of the browser software application. In this embodiment, the portion 522 includes a set of controls that indicates a desire for the generation of event data and the specification of additional data that may be included in the event data (and eventually the published messages). Specifically, in one embodiment, a control 524 corresponds to a "Publish Link" control in which the message originator 102 indicates a desire to publish a message in which a current network resource identified (e.g., a specific link) is included in the published message. In another embodiment, a control 526 corresponds to a "Share It!" control in which the message originator 102 indicates a desire to publish a message in which the current network resource being browsed and/or the specific content displayed on the screen rendering 520 is included in the published message.

In yet another embodiment, a control 528 corresponds to a "Help" control in which the message originator 102 indicates a desire to seek assistance regarding access to the current network resource being browsed and/or the content currently displayed on the screen rendering 520. In all of the above controls, a user does not explicitly generate the message content. Instead, upon receipt of an intent to publish, the control obtains/collects the necessary information that will be transmitted to the messaging provider component 108 as event data and included in a published message. Although the screen rendering 520 has been illustrated as incorporating all three controls 524, 526, and 528, one skilled in the relevant art will appreciate that each control may be used independently. Additionally, a screen rendering, such as screen rendering 520, may include any number or variety of controls in which specific information is to be collected and/or which is targeted to be delivered to specific message recipients. Thus, controls 524, 526 and 528 are illustrative in nature.

Figure 6A:
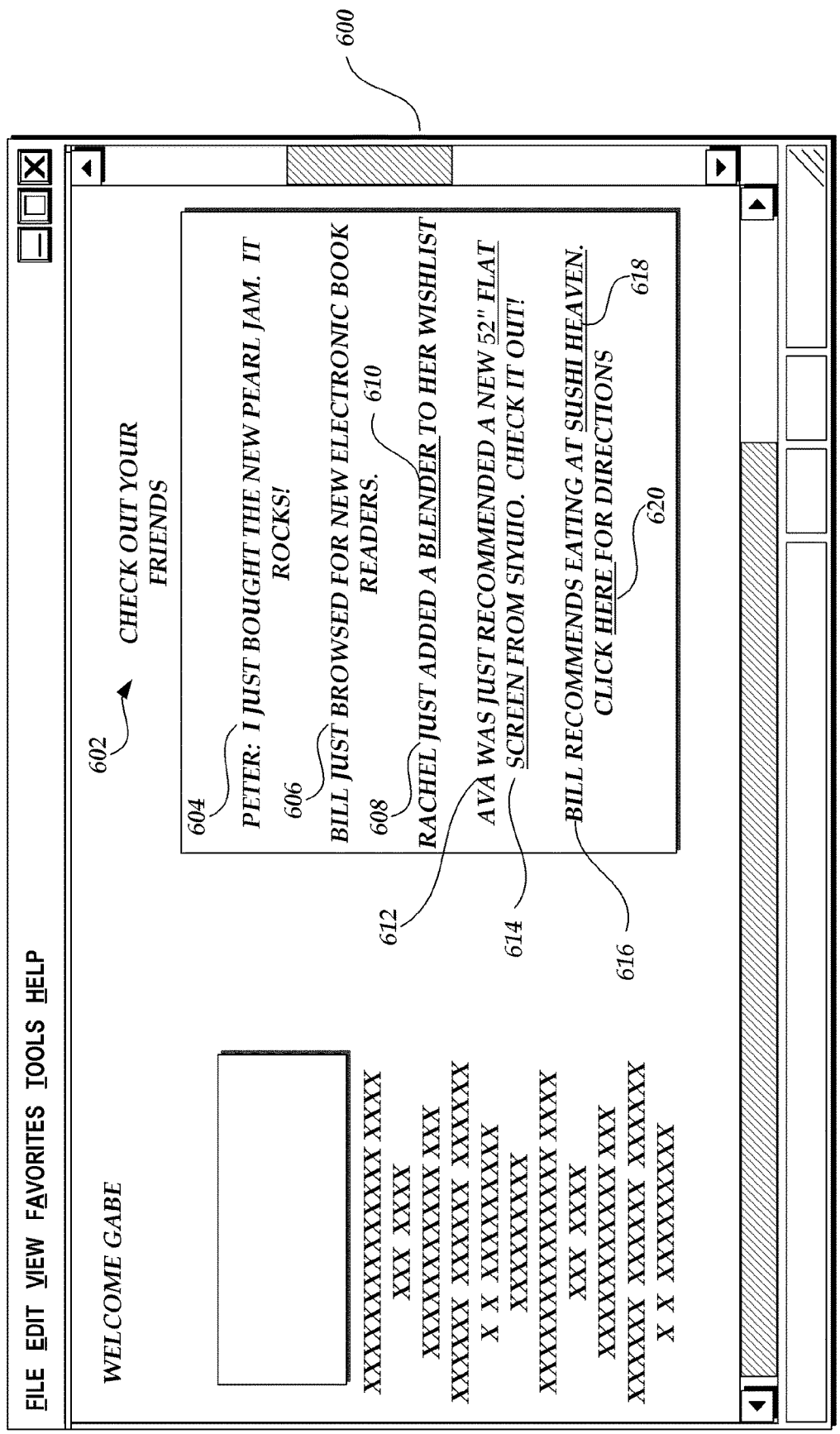
FIGS. 6A-6C are illustrative screen renderings generated by message recipient client computing devices corresponding to the publication of messages by a messaging provider component.
Figure 6B:
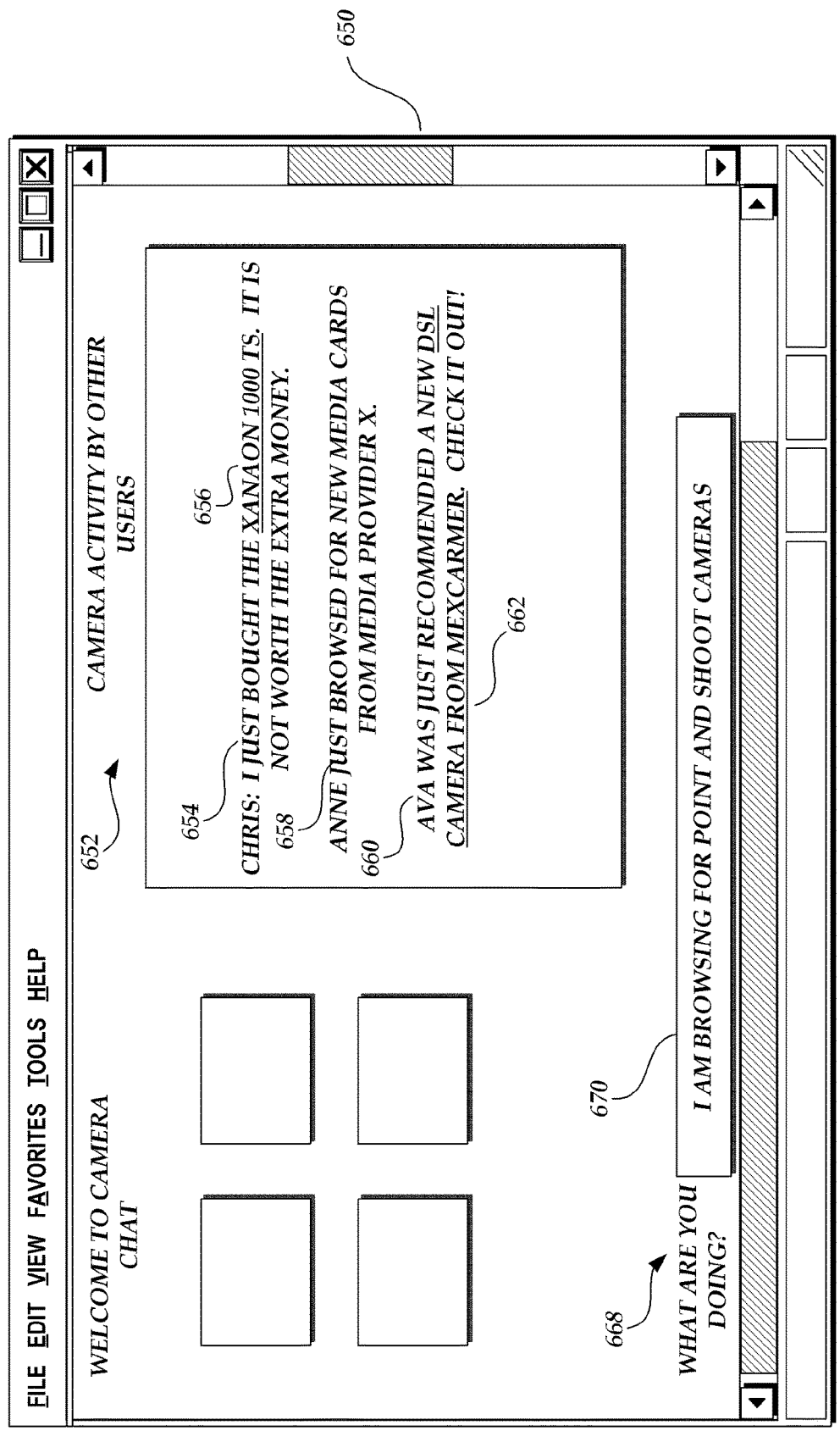
Figure 6C:
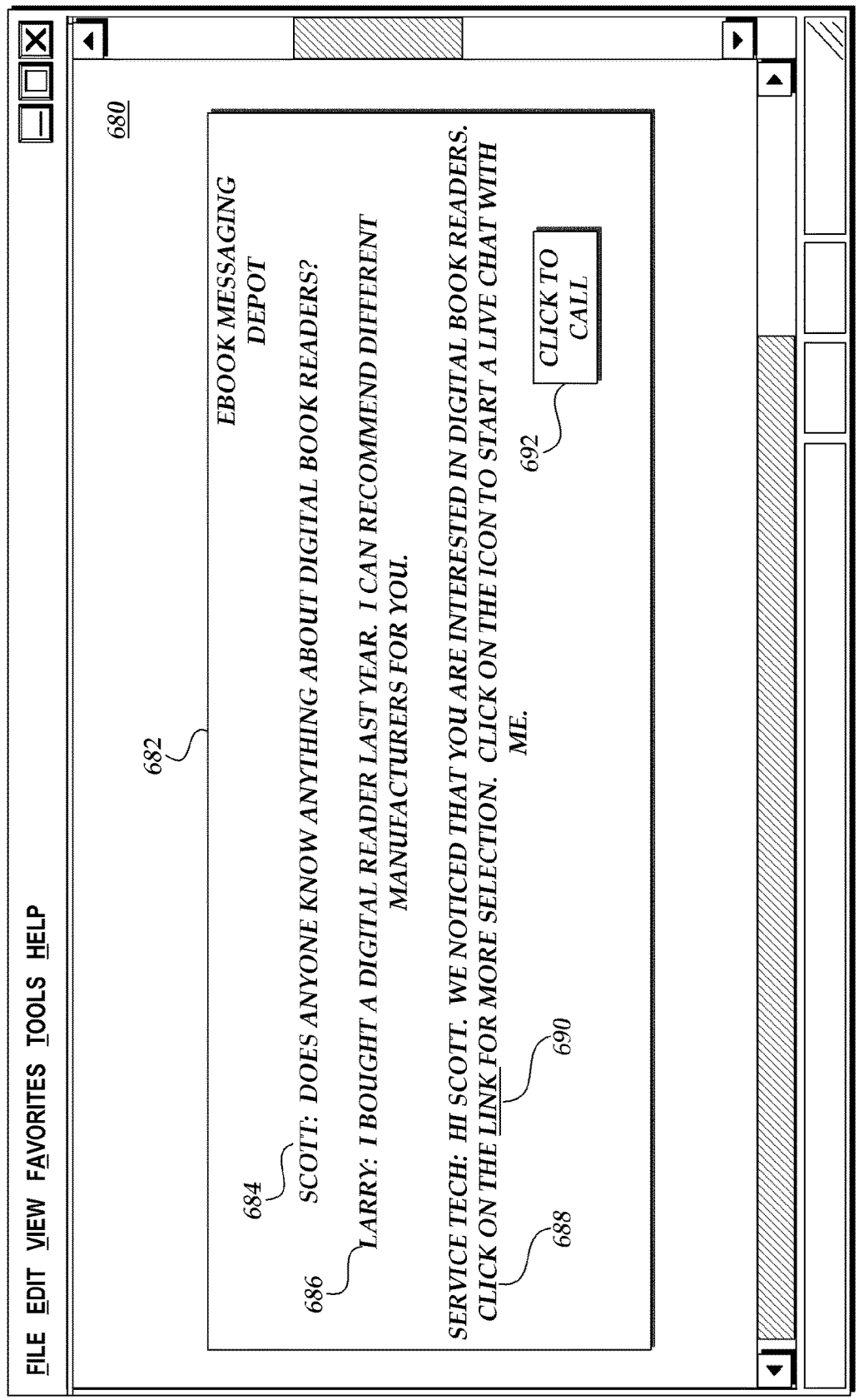

With reference now to FIGS. 6A-6C, illustrative screen renderings 600, 650 and 680 generated by the message recipients 104 for receiving or otherwise accessing published messaging data will be described. With reference to FIG. 6A, the screen rendering 600 can correspond to a network resource provided by a content provider 110 and accessed by identified message recipient(s) 104, although for purposes of the illustrative examples in FIGS. 6A-6C, a single message recipient 104 will be discussed. Such a limitation should not be construed as limiting.

In this embodiment, the network resource is a customized network resource (e.g., a customized web site) that can include a variety of content associated with message recipient 104 including a portion 602 for displaying published messages. For purposes of an illustrative example, portion 602 further corresponds to published messages from message originators 102 included in the social graph of the message recipient 104 (e.g., filtering according message recipient rules).

As illustrated in FIG. 6A, the portion 602 includes a first published message 604 that identifies a message originator 102 ("Peter") and includes a text-based message likely generated specifically by the message originator. Portion 602 also includes a second published message 606 that identifies a different message originator 102 ("Bill") and includes a text-based message likely generated based on the message originator's activities. In a similar manner, portion 602 includes a third message 608 from yet a different message originator 102 ("Rachel") that also was likely generated based on the message originator's activities. Additionally, message 608 has also been enhanced by the inclusion of a hyperlink 610 that can be selected to access more information about the message (e.g., about the blender), purchase a corresponding product, and the like.

With continued reference to FIG. 6A, portion 602 can include a fourth message 612 from still a further message originator 102 ("Ava"). Similar to message 608, message 612 has been enhanced by the inclusion of a hyperlink 614. Additionally, for purposes of an illustrative example, message 612 corresponds to event data that may have been submitted by a service provider 112, such as a recommendation service, working in conjunction with a content provider 110 and does not correspond to explicit actions conducted by the message originator. Portion 602 includes a fifth message 616 from a previous message originator 102 ("Bill"). Message 616 has been enhanced with a hyperlink 618 that corresponds to subject matter associated with the content of the message and a hyperlink 620 to a service provider 112 for generating additional interaction with the message recipient 104. With reference to the previous illustrative example, message 616 may have been generated from event data provided by an enhanced information service provider 112 based on the submission of a picture of the storefront or of a menu.

In an illustrative embodiment, messages 604, 606, 608, 612, and 616 may be ordered in accordance with a time in which they were published by the messaging provider component 108. Alternatively, the messages may be published based on prioritization information provided by the message provider component 108, the message originator 102, and/or the message recipient 104. For example, messages 606 and 616 may represent event data received from two different sources that has been prioritized based on criteria provided by the messaging provider component. As previously described, in an illustrative embodiment, credit may be allocated based on the publication of the messages and/or eliciting a defined activity from the message recipients 104, such as selecting one of the displayed controls or the submission of a code included in the published message. In accordance with this embodiment, the published messages may be prioritized in accordance with credit criteria to prioritize higher incentive-based messages or to remove/mitigate such messages for the message recipients 104.

With reference now to FIG. 6B, a screen rendering 650 can correspond to a network resource provided by a content provider 110 or messaging provider component 108 and accessed by an identified message recipient 104. In this embodiment, the network resource is a customized network resource (e.g., a customized web site) for publishing messages in portion 652. For purposes of an illustrative example, portion 652 further corresponds to published messages from message originators 102 in which the subject matter of the published message is utilized as filtering criteria (e.g., message recipients that wish to receive messages published on the topic of "cameras").

As illustrated in FIG. 6B, the portion 652 includes a first published message 654 that identifies a message originator 102 ("Chris") and includes a text-based message likely generated specifically by the message originator. Message 654 includes a hyperlink 656 to an identifiable product that could provide additional information about the product, provide additional details regarding the message originator's review of the product, facilitate the purchase of the identified product, and the like. Portion 652 also includes a second published message 658 that identifies a different message originator 102 ("Anne") and includes a text-based message likely generated based on the message originator's activities. In a similar manner, portion 652 includes a third message 660 from yet a different message originator 102 ("Ava") that also was likely generated based on the message originator's activities. Additionally, message 660 has also been enhanced by the inclusion of a hyperlink 662 that can be selected to access more information about the message (e.g., "DSL Camera from Mexcarmer"), purchase a corresponding product, and the like. Message 660 corresponds to event data that may have been submitted by a service provider 112, such as a recommendation service, working in conjunction with a content provider 110 and does not correspond to explicit actions conducted by the message originator.

With continued reference to FIG. 6B, screen rendering 650 can further include a messaging data generation portion 668 for obtaining messaging data from the message recipient 104. As discussed with regard to FIG. 5A, portion 668 includes a text entry control 670 for obtaining text-based messaging data from the original message recipient 104, now serving in the capacity of a message originator 102. Portion 668 may be utilized for message originators 102/message recipients 104 to create threads or conversations. Although not shown, in an alternative embodiment, the screen rendering 650 may also generate additional portions for creating private or restricted message publications between two or more message originators/message recipients.

With reference now to FIG. 6C, a screen rendering 680 also corresponding to a network resource provided by a content provider 110 or messaging provider component 108 and accessed by an identified message recipient 104 will be described. In this embodiment, the screen rendering 680 is a customized network resource (e.g., a customized web site) for publishing messages that includes at least one portion 682 for publishing messages from message originators 102 (e.g., "EBook Messaging Depot"). For purposes of an illustrative example, the network resource further corresponds to published messages from message originators 102 in which additional user interaction occurs between one or more message recipients (FIG. 3D).

As illustrated in FIG. 6C, the portion 682 includes a first published message 684 that identifies a message originator 102 ("Scott") and includes a text-based message (illustratively a question) likely generated specifically by the message originator as messaging data or based on event data (e.g., a submitted question to another network resource) obtained from a content provider 110. The portion 682 also includes a second published message 686 that identifies a different message originator 102 ("Larry") and includes a text-based message likely generated by the message originator and responsive to the previous published message. In an illustrative embodiment, the message originator 102, messaging provider component 108 or content provider 110 may specify via filtering criteria qualifications for message recipients 104 to receive/access published messages and/or to publish responsive messages. For example, a message originator 102 may specify that only professionally certified message recipients or message recipients certified by the messaging provider component 108 may receive or can access the original published message requesting technical assistance. In another example, a messaging provider component 108 may establish a separate qualification program for establish credentials/qualifications for message recipients 104.

With continued reference to FIG. 6C, the portion 682 further includes a third message 688 from a different message originator 102 ("Service Tech"). In this example, the message originator 102 corresponds to a service provider 112 that may have subscribed to receive messages about the specific subject matter of the message originator's published message. In this example, message 688 includes a hyperlink 690 in which the responding message originator 102 may provide additional information to the original message originator 102. Additionally, message 668 includes an additional control 692 to facilitate "click-to-call" functionality, such as a VOIP communication session. In this embodiment, the original message originator ("Scott") and the subsequent message originator ("Service Tech") can begin a more detailed or enhanced interaction once a higher expectation for communication has been established by the exchange of published messages.

As previously indicated, the screen renderings illustrated in FIGS. 6A-6C can be based on a variety of interactions between message originators 102, message recipients 104, content provider(s) 110 and/or service provider(s) 112. For purposes of an illustrative example, assume a message originator 102 can access content (e.g., "Book A") via an electronic book reader computing device. The content may have been previously provided by a content provider 110 and stored locally on the computing device or may otherwise be provided to the computing device via the communication network 104 (e.g., streaming content). While reading the book, the message originator 102 determines that he or she would like to ask a question about a particular chapter or passage in the book (e.g., "Chapter 11 of Book A"). Using the electronic book reader computing device, the message originator 102 generates messaging data or event data that corresponds to the particular question. The messaging data may correspond to message explicitly generated by the message originator 102 on the computing device (e.g., via a user interface generated on the computing device). Alternatively, the event data may correspond to information generated by controls/interfaces provided on the computing device (e.g., the electronic book reader). Such controls/interface provide relevant event data to the messaging provider component 108 that results in the content included in a published message (e.g., an "Ask a Question" control button on the computing device that can obtain text corresponding to a user's question and add additional identification information about the content currently being accessed). The messaging data and/or activity data corresponding to the event data may be transmitted from the computing in real-time, or substantially real-time, utilizing the communication network 104, such as via a wireless communication channel.

Based on the submitted messaging data and/or event data, the messaging provider component 108 can process the messaging data and/or event data to identify, or otherwise generate, the target set of messages related to the message originator's question. The messaging provider component then identifies the set of message recipients 104 that will receive, or otherwise access, the target set of messages related to the message originator's questions, such as by applying applicable message originator filtering rules, message recipient filtering rules, content provider filtering rules and/or additional filtering rules. Specifically, assume that a number message recipients 104 have provided filtering rules in which they have elected to receive messages related to the specific book (e.g., Book A), chapter in the book (e.g., Chapter 11), and/or characters in the book mentioned in the message originator's question. Additionally, assume that the messaging provider component 108 has further provided filtering rules that each of the potential message recipients 104 has to have qualified to comment on the book by passing a short test that establishes their understanding of the book. After processing the filtering rules, the messaging provider component 108 then selectively communicates the target set of messages to the message recipient(s) 104 (e.g., publishing the messages to a messaging network resource). After accessing the published messages, the message recipient(s) 104 may become message originators 102 by submitting responsive messages to the original message originator 102. Additionally, some of the message recipients, such as a service provider 112, may include additional controls, such as click to call control or a hyperlink to a "Book A" discussion network resource, to initiate additional communications with the original message originator 102.

While illustrative embodiments have been disclosed and discussed, one skilled in the relevant art will appreciate that additional or alternative embodiments may be implemented within the spirit and scope of the present disclosure. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with the scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer executable components, such as a CD-ROM, DVD-ROM, or network interface. Further, the component and/or data can be included in a single device or distributed in any manner. Accordingly, general purpose computing devices may be configured to implement the processes, algorithms and methodology of the present disclosure with the processing and/or execution of the various data and/or components described above. Alternatively, some or all of the methods described herein may alternatively be embodied in specialized computer hardware. In addition, the components referred to herein may be implemented in hardware, software, firmware or a combination thereof.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method for selectively communicating messages comprising:
   obtaining messaging data based at least in part on a message originator's manipulation of an interface control within a browser application, wherein the messaging data is generated by the message originator's interaction with the interface control;
   processing the messaging data based, at least in part, on a processing rule, wherein the processing rule is configured to modify at least one of format or content of the messaging data;
   identifying a first set of potential message recipients based on a first filtering rule provided by the message originator;
   identifying a first set of message recipients from the first set of potential message recipients based on a second filtering rule provided by the potential message recipients;
   processing the messaging data to determine a first set of one or more messages to be selectively communicated to the first set of message recipients as a function of the messaging data; and
   causing the selective communication of the first set of one or more messages to be published to the first set of message recipients based at least in part on the message originator's interaction with the interface control.

2. The method as recited in claim 1, wherein the one or more messages published to the first set of message recipients includes at least one control for facilitating additional interaction between the message originator and a message recipient, wherein the at least one control corresponds to a control operative to initiate a direct communication channel between the message originator and the message recipient.

3. The method as recited in claim 2, wherein the direct communication channel corresponds to a voice over IP communication channel.

4. The method as recited in claim 1, wherein a subsequent message originator is a service provider.

5. The method as recited in claim 1, wherein the messaging data corresponds to a message originator submitted question.

6. The method as recited in claim 1, wherein processing the messaging data corresponds to including at least one selectable control in at least one of the one or more messages to be selectively communicated to the set of message recipients.

7. The method as recited in claim 6, wherein the at least one selectable control includes at least one embedded hyperlink based on a subject matter associated with the messaging data.

8. The method as recited in claim 1, wherein the at least one control corresponds to one or more hyperlinks, wherein the hyperlinks are associated with content generated from processing the messaging data.

9. The method as recited in claim 1, wherein the messaging data corresponds to multi-media data.

10. The method as recited in claim 1, wherein the second filtering rule comprises rules for electing receipt of the one or more messages corresponding to message originators identified in a social graph associated with the at least one of the set of message recipients.

11. The method as recited in claim 1, wherein at least some of the messaging data is provided by a service provider.

12. A system for managing the selective communication of content comprising:
   a data store operative to maintain processing data corresponding to at least one of messaging data and event data; and
   a computing device in communication with the data store and that is operative to:
      obtain messaging data based at least in part on a message originator's manipulation of an interface control within a browser application, wherein the messaging data is generated by the message originator's interaction with the interface control;
      process the messaging data according to the processing rules in the data store, wherein the processing rules are configured to modify at least one of format or content of the messaging data;
      identify a first set of potential message recipients based on a first filtering rule provided by the message originator;
      identify first message recipients from the first set of potential message recipients based on a second filtering rule provided by the potential message recipients;
      cause the selective communication of a first set of one or more messages to the first message recipients based at least in part on the message originator's interaction with the interface control, wherein the content of the first set of one or more messages is based at least in part on the messaging data.

13. The system as recited in claim 12, wherein the one or more messages published to the first set of message recipients includes at least one control for facilitating additional interaction between the message originator and a message recipient, wherein the at least one control corresponds to a control operative to initiate a direct communication channel between the message originator and the message recipient.

14. The system as recited in claim 13, wherein the direct communication channel corresponds to a voice over IP communication channel.

15. The system as recited in claim 12, wherein the message recipient was previously qualified to obtain the selectively communicated message.

16. The system as recited in claim 12, wherein the message recipient corresponds to a service provider.

17. The system as recited in claim 16, wherein the service provider is associated with a content provider.

18. The system as recited in claim 12, wherein the at least one control includes at least one embedded hyperlink based on a subject matter associated with the messaging data.

19. The system as recited in claim 12, wherein the at least one control corresponds to one or more hyperlinks, wherein the hyperlinks are associated with content generated from the processed messaging data.

20. The system as recited in claim 12, wherein the messaging data corresponds to multi-media data.

21. A method for generating messaging data comprising:
   generating at least one control for obtaining messaging data, wherein the control is generated on a browser software application independent of a network resource being rendered by the browser software application;
   obtaining a user manipulation of the at least one control, the user manipulation received from a message originator;
   processing the messaging data based, at least in part, on a processing rule, wherein the processing rule is configured to modify at least one of format or content of the messaging data;
   identifying a first set of potential message recipients based on a first filtering rule provided by the message originator;
   identifying a first set of message recipients from the first set of potential message recipients based on a second filtering rule provided by the potential message recipients; and
   transmitting the user manipulation of the at least one control, wherein the transmission of the user manipulation is operative to request publication of a first message to the first set of message recipients on behalf of the message originator associated with the browser software application to the set of message recipients, wherein content of the first message is based on the messaging data.

22. The method as recited in claim 21, wherein the at least one control corresponds to a control for obtaining messaging data from the message originator.

23. The method as recited in claim 22, wherein the messaging data corresponds to text-based messaging data.

24. The method as recited in claim 21, wherein the at least one control comprises a second control for obtaining event data from the message originator, wherein the event data corresponds to interaction with a network resource via a communication network.

25. The method as recited in claim 24, wherein the second control is configured to control publishing a resource identifier associated with the network resource.

26. The method as recited in claim 24, wherein the second control is configured to control publishing a resource identifier associated with the network resource and at least a subject matter of the network resource.

27. The method as recited in claim 24, wherein the second control is configured to control requesting assistance with the network resource.

28. A system for generating messaging data comprising:
- a computing device that is operative to execute computer executable components, including:
- a data processing component for generating at least one control for obtaining messaging data, wherein the control is generated on a browser software application independent of a network resource being rendered by the browser software application;
- an interface component for obtaining a user manipulation of the at least one control, the user manipulation received from a message originator; and
- a messaging interface component for transmitting the user manipulation of the at least one control, wherein the transmission of the user manipulation is operative to request publication of a first message to a first set of message recipients on behalf of the message originator associated with the browser software application, wherein the message interface component is operative to:
  - process the messaging data based, at least in part, on a processing rule, wherein the processing rule is configured to modify at least one of format or content of the messaging data;
  - identify a first set of potential message recipients based on a first filtering rule provided by the message originator, and
  - identify the first set of message recipients from the first set of potential message recipients based on a second filtering rule provided by the potential message recipients.

29. The system as recited in claim 28, wherein the at least one control corresponds to a control for obtaining messaging data from the message originator.

30. The system as recited in claim 29, wherein the messaging data corresponds to text-based messaging data.

31. The system as recited in claim 28, wherein the at least one control comprises a second control for obtaining event data from the message originator, wherein the event data corresponds to interaction with a network resource via a communication network.

32. The system as recited in claim 31, wherein the second control is configured to control publishing a resource identifier associated with the network resource.

* * * * *